Inventor
Frank C. Choice
By his Attorney
Thomas J. Ryan

Inventor
Frank C. Choice
By his Attorney
Thomas J. Ryan

April 7, 1953          F. C. CHOICE          2,633,585
LASTING MACHINE
Filed June 3, 1950                             11 Sheets-Sheet 4
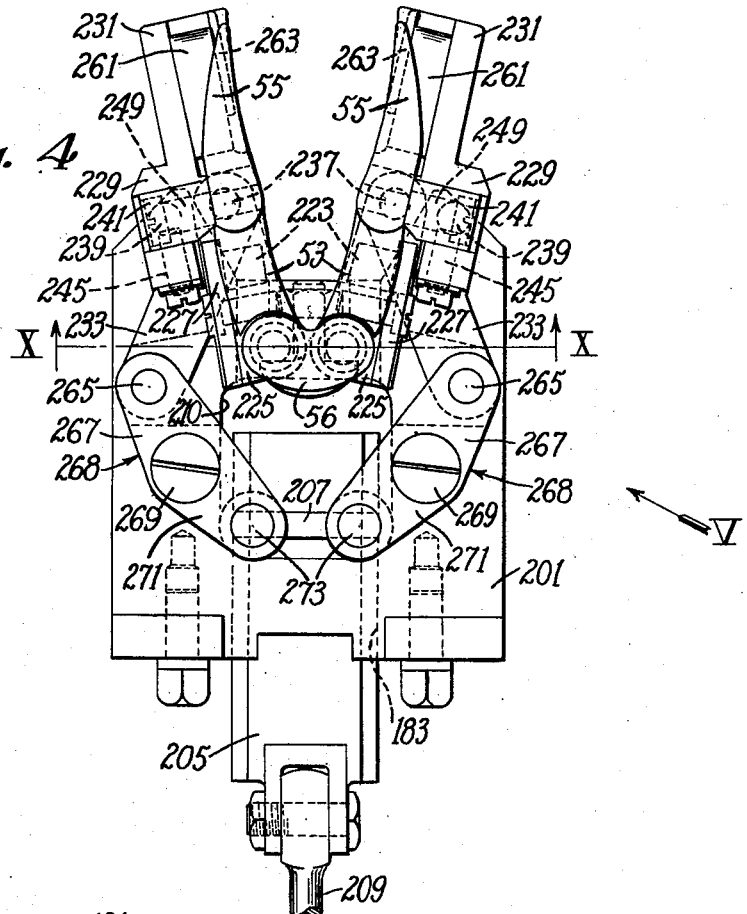
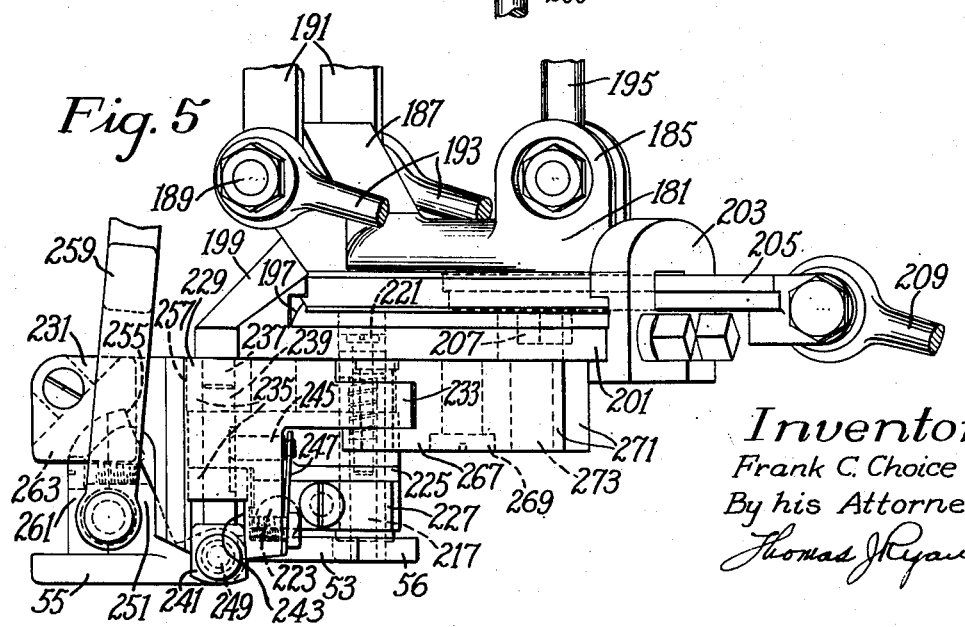
Inventor
Frank C. Choice
By his Attorney
Thomas J. Ryan April 7, 1953  F. C. CHOICE  2,633,585
LASTING MACHINE
Filed June 3, 1950  11 Sheets-Sheet 5

Inventor
Frank C. Choice
By his Attorney
Thomas J. Ryan

April 7, 1953

F. C. CHOICE 2,633,585

LASTING MACHINE

Filed June 3, 1950

Inventor
Frank C. Choice
By his Attorney
Thomas J. Ryan

April 7, 1953  F. C. CHOICE  2,633,585
LASTING MACHINE
Filed June 3, 1950  11 Sheets-Sheet 8

Inventor
Frank C. Choice
By his Attorney
Thomas J. Ryan

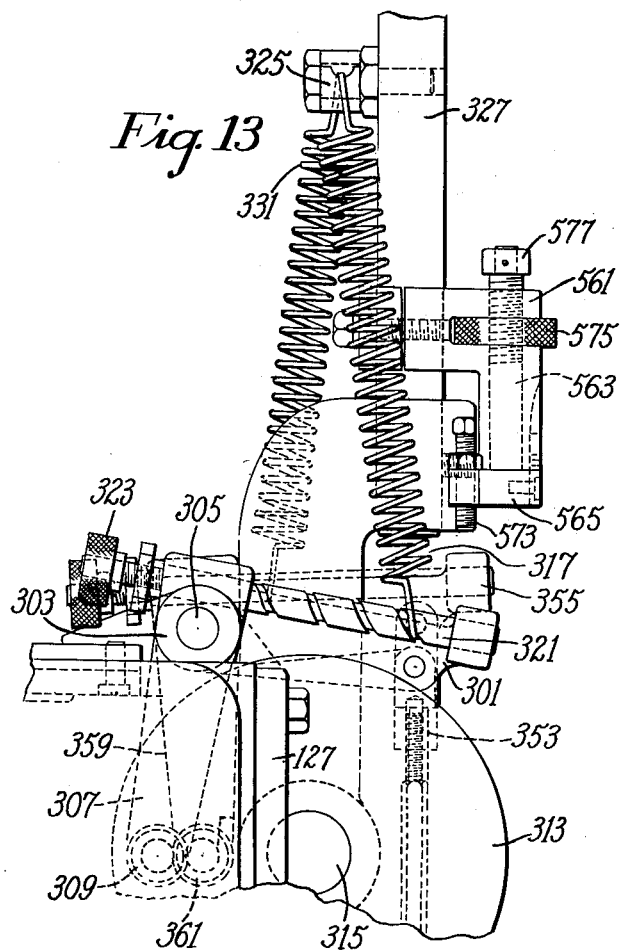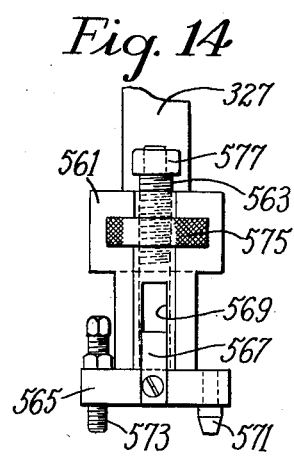

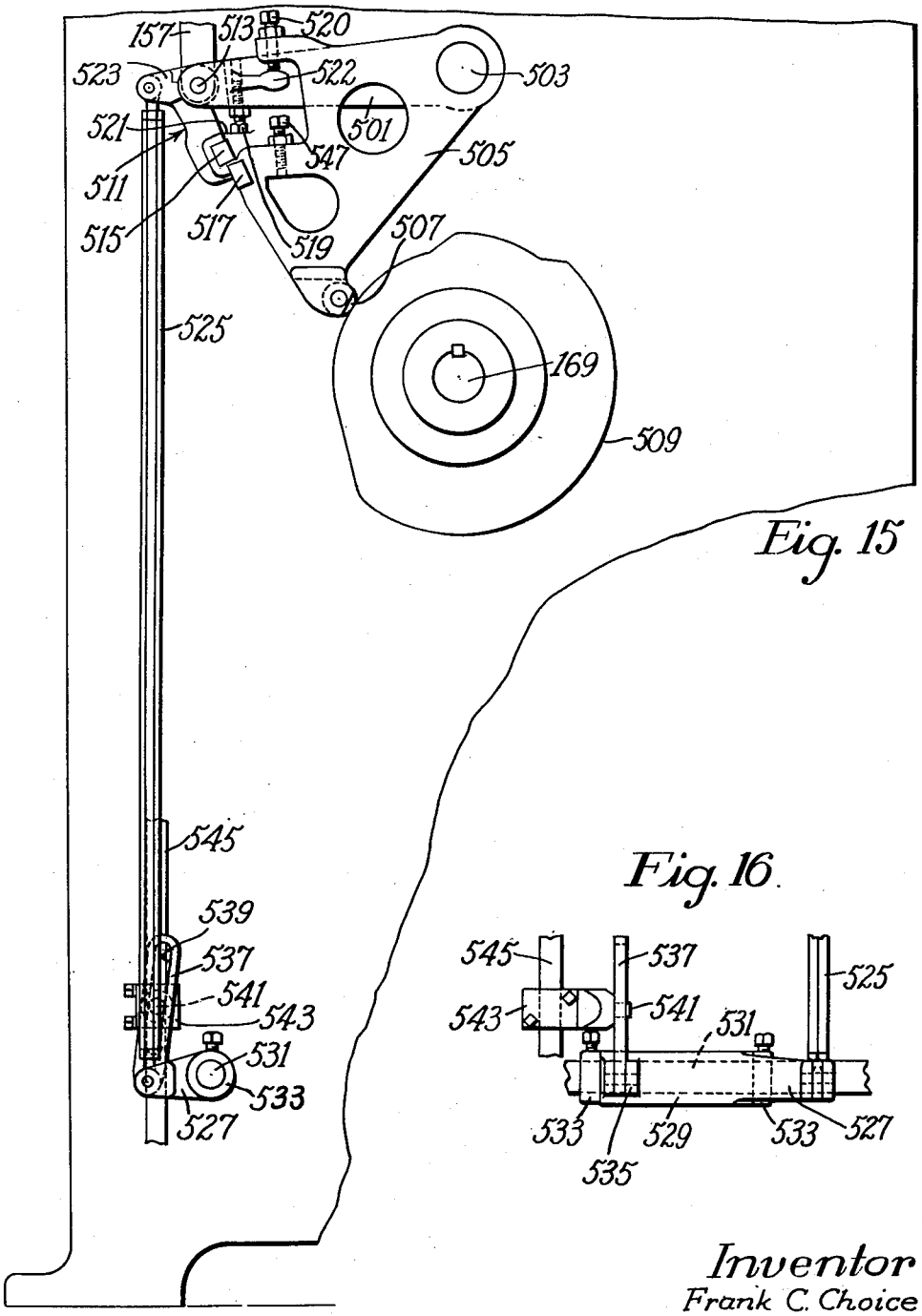

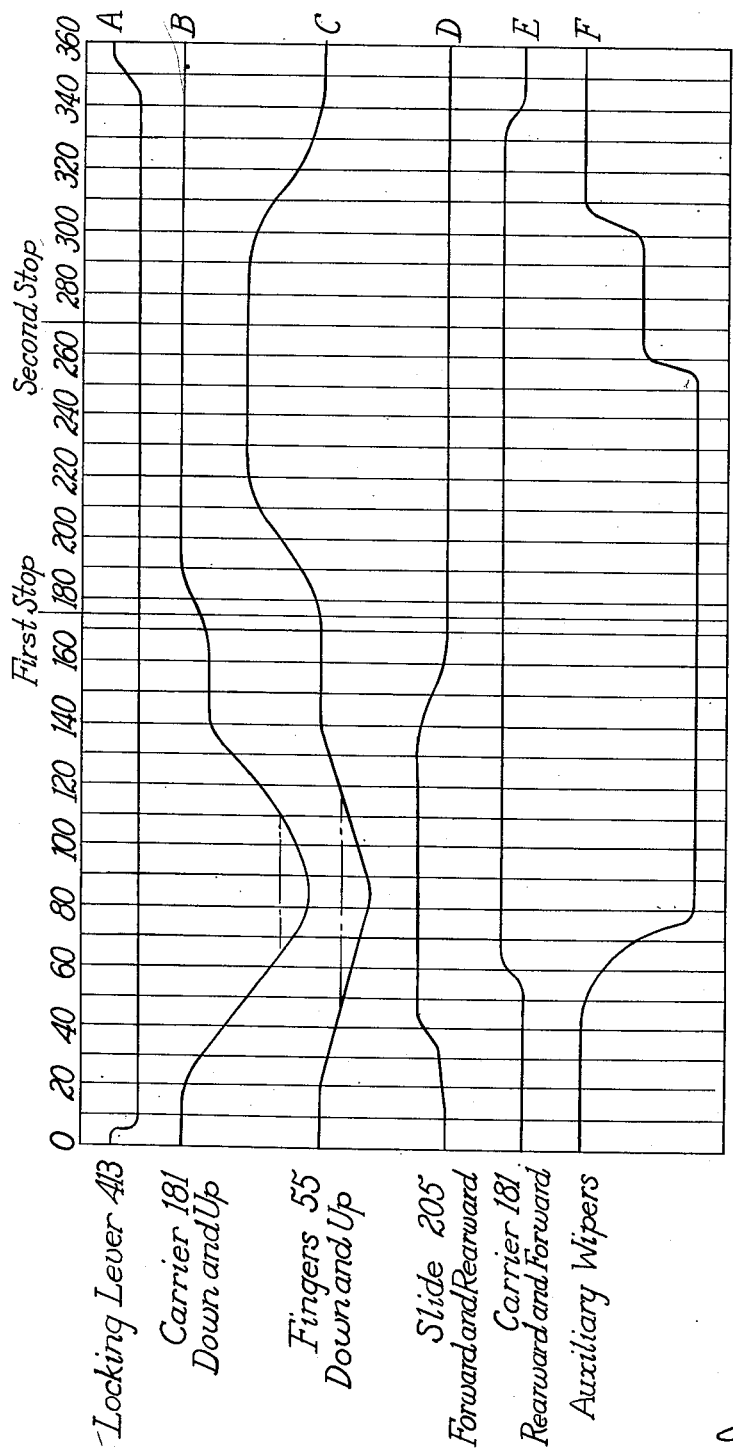

Patented Apr. 7, 1953

2,633,585

UNITED STATES PATENT OFFICE 2,633,585

LASTING MACHINE

Frank Coleman Choice, Leicester, England, assignor to United Shoe Machinery Corporation, Flemington, N. J., a corporation of New Jersey Application June 3, 1950, Serial No. 165,895
In Great Britain June 21, 1949

36 Claims. (Cl. 12—8.8)

This invention relates to lasting machines, and more particularly to machines for lasting the toe ends of shoes. It is herein shown as applied to a machine constructed in many respects as disclosed in United States Letters Patent No. 2,160,846, granted on June 6, 1939, on an application of F. C. Eastman and A. F. Pym, but it is to be understood that it is not thus limited in its applicability.

The machine shown in the above-mentioned Letters Patent, which is constructed especially for lasting the toe ends of welt shoes, is provided with toe-embracing wipers for wiping the upper about the toe end of the last heightwise of the last and for thereafter wiping its marginal portion inwardly over the feather of an insole on the last and against a lip on the insole, and also with grippers which grip and pull the toe end of the upper and thereafter exercise a restraining and controlling action on the upper in the course of the operation of the wipers thereon. Instead of such grippers, the machine has been provided heretofore with means for clamping the marginal portion of the upper outspread on the wipers to control it in the lasting operation, as disclosed, for example, in United States Letters Patent No. 2,380,407, granted on July 31, 1945, on an application of P. E. Burby.

The present invention, in one aspect, provides improved means associated with the wipers for thus clamping and controlling the upper. The construction shown comprises a pair of fingers, hereinafter termed retarder fingers, arranged to clamp the marginal portion of the upper outspread on the wipers near the extreme end of the toe, and a pair of auxiliary retarder fingers arranged to extend along the sides of the toe beyond the first-mentioned fingers which, for convenience of designation, may be termed the main fingers. This arrangement of retarder fingers is in some respects similar to that disclosed in a United States Letters Patent No. 2,516,970, granted on August 1, 1950, on an application of S. E. Frampton. In accordance with that prior disclosure, however, in operating on shoes of the McKay or flat-lasted type, the fingers were engaged with the insole initially in locations comparatively remote from its edge and were moved outwardly from those locations to spread the marginal portion of the upper away from the insole before clamping it on the wipers. It is one of the objects of the present invention to deal with problems arising more particularly in the lasting of shoes of the welt type in which the insole is provided near its edge with a welt-attaching lip. In the machine herein shown the shoe is positioned, as heretofore, for the toe-lasting operation by a device which engages the inner face of the lip of the insole around the toe and extends upwardly beyond the lip, the shoe being bottom upward. This device is detachable to permit other devices to be substituted for use on shoes of different styles and sizes. The above-mentioned auxiliary retarder fingers extend to positions not far from the foremost side pulling-over tacks, and in order to insure that the tips of these fingers will lie inside of the upstanding marginal portion of the upper materials, including the lining, when the shoe is presented to the machine, the tips of the fingers are comparatively thin widthwise of the shoe and are held yieldingly against the sides of the shoe-positioning device above the lip of the insole whatever the shape or size of the device. For this purpose there is provided a spring acting on the fingers through a movable member which serves as a support for means whereby all the fingers are later swung in outward directions widthwise of the shoe. In order that outward movements of definite extent will thus be imparted to the fingers, mechanism is provided for locking the movable support shortly after the beginning of a cycle of operations of the machine, thus preventing the spring from having any influence on such movements of the fingers.

Further to insure that the tips of the auxiliary fingers will be positioned properly inside of the upstanding margin of the upper materials when the shoe is presented to the machine, these fingers, in the construction shown, are downwardly inclined initially toward the heel end of the shoe relatively to the main fingers. To permit this, the auxiliary fingers are mounted for swinging movements heightwise of the shoe about axes located close to the heelwardly directed ends of the main fingers. Shortly after the beginning of the cycle of operations the main fingers, together with a retarder member for engaging the upper at the extreme end of the toe, are moved downwardly into positions to clamp the upper on the wipers when the latter are below the level of the toe end of the insole. Since the tips of the auxiliary fingers, because of their proximity to portions of the upper held by the foremost side pulling-over tacks, cannot be moved downwardly so far as the main retarder fingers, members connected to the auxiliary fingers cause them to swing about their axes to positions in which they are upwardly inclined in a heelward direction as the main fingers receive their downward movements. As the main fingers are thereafter moved upwardly by the wipers in the wiping of the upper heightwise of the last, the auxiliary fingers are swung reversely to positions in which they are substantially parallel to the wipers by the time the wipers arrive in positions to begin to wipe the upper inwardly over the insole. When the wipers are about to begin their inward wiping movements, the main fingers and the retarder member at the extreme end of the toe are moved upwardly enough to relieve somewhat the pressure on the portions of the upper which they engage, so that this pressure will not become excessive by reason of the gathering or pleating action taking place in the margin of the upper materials as the upper is wiped inwardly. At the same time the full pressure of the auxiliary fingers on the upper is maintained, in order to minimize any tendency for portions of the upper in the vicinity of the tip line to be displaced in a heelward direction. In order to prolong the control of the upper by the retarder fingers, they are moved inwardly widthwise of the shoe with the wipers.

The invention further provides auxiliary wipers to assist in the lasting of portions of the upper also acted upon by the main wipers at the sides only of the toe, the construction shown being such that the upper is clamped on these auxiliary wipers by the auxiliary retarder fingers. The auxiliary wipers, after they have been moved inwardly against the sides of the toe by their operating mechanism, are under the influence of springs which, after the upwiping operation, tend to move them inwardly over the insole with the main wipers. Neither the auxiliary wipers nor the auxiliary fingers cooperating with them to clamp the marginal portion of the upper have any movements lengthwise of the shoe as they are moved inwardly with the main wipers, this being an important factor in counteracting any tendency for the main wipers to displace the upper in the vicinity of the tip line in a heelward direction. After the retarder fingers have been moved upwardly away from the wipers, the auxiliary wipers under the influence of their springs, if controlled by a cam hereinafter described, are held pressed inwardly against upstanding marginal portions of the upper at the sides of the toe and thus assist in preventing any objectionable displacement of the margin in those locations during partial retractive movements and repeated inward movements of the main wipers which take place after their first inward wipe.

The invention also provides novel means for preventing any danger of damage to the auxiliary wipers if the machine is operated without any shoe therein. If it were not for such means the auxiliary wipers would be moved farther inwardly by their operating mechanism in the absence of a shoe than if a shoe were present, and in consequence, in moving upwardly with the main wipers, might be damaged by contact with means provided for positioning the shoe. For the purpose in view, the construction shown comprises means dependent upon the absence of a shoe from the machine for causing lost motion between parts of the mechanism for imparting the inward movements to the auxiliary wipers and for thereby restricting such movements of these wipers. To render the absence of the shoe thus effective, a device which is displaceable to cause the lost motion is controlled by shoe-clamping means which moves a greater distance if there is no shoe in the machine and thereby serves to effect the displacement of the device.

The above and other features of the invention, including various novel details of construction and combinations of parts, will now be more particularly described with reference to the accompanying drawings and thereafter pointed out in the claims.

In the drawings,

Fig. 4 is an inverted plan view of the retarder means;

Fig. 5 is a view looking in the direction of the arrow V in Fig. 4;

Fig. 13 is a right-hand side elevation of a portion of the structure shown at the top of Fig. 1, together with an adjustable stop device which may be provided for a purpose hereinafter explained;

Fig. 14 is a view in rear elevation of parts shown in Fig. 13;

Fig. 15 is a view in right-hand side elevation, with parts broken away, showing safety means which may be provided to insure against damage to the auxiliary wipers if the machine is operated in the absence of a shoe and also showing an alternative cam for operating the auxiliary wipers;

Fig. 16 is a front elevation of a portion of the structure shown in Fig. 15; and Fig. 17 is a chart illustrating the timing of the operations of certain portions of the machine.

Figure 6:
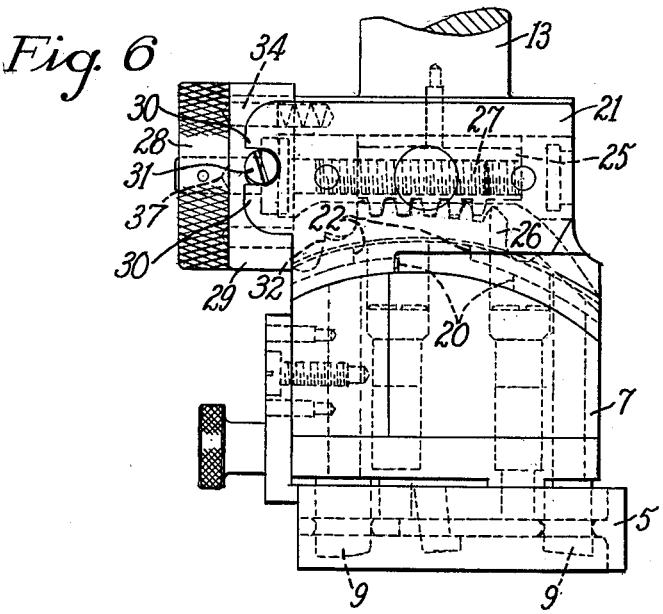
Fig. 6 is a view in right-hand side elevation of the shoe-positioning means.
Figure 7:
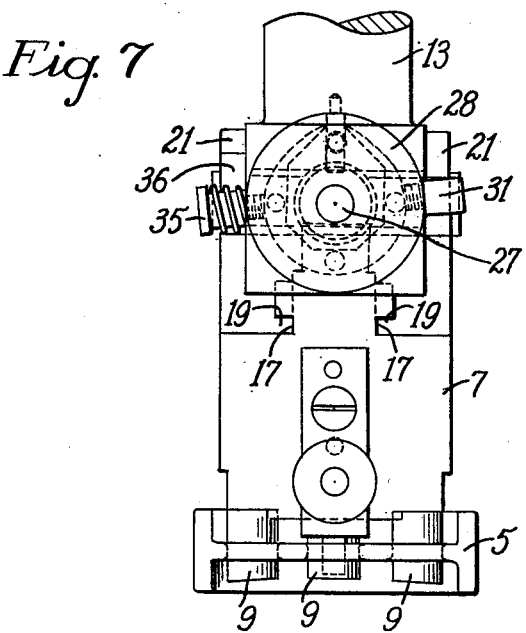
Fig. 7 is a view in front elevation of the shoe-positioning means shown in Fig. 6.

Like the machine shown in Letters Patent No. 2,160,846, the machine herein shown includes a main frame 1 which houses the greater portion of the operating mechanism and a head casting 3 secured on the top thereof. For positioning the shoe bottom upward there is provided means arranged to engage the bottom of the toe end of the insole in general accordance with the disclosure of United States Letters Patent No. 2,385,414, granted on September 25, 1945, on an application of E. A. Holmgren. This shoe-positioning means includes a plate 5 (Figs. 6 and 7) supported on a block 7 and a plurality of insole-engaging pins 9 secured in the block and extending downwardly through apertures in the plate. The plate 5 has a flanged periphery shaped to engage the inner face of the lip of the welt shoe insole around its toe end portion and to support the lip against inward pressure of the wipers (hereinafter described) in the course of the toe-lasting operation. The plate also serves by engagement with the insole lip to position the shoe lengthwise and laterally. The plate is detachably supported on the block 7 in a manner similar to the disclosure of the last-mentioned Letters Patent, and when the shoe is pressed upwardly near the beginning of the cycle of operations of the machine by a toe rest 11 (Figs. 1 and 3), the plate yields upwardly until the pins 9 engage the insole and position the shoe heightwise at the proper level for the wipers to operate correctly thereon.

The block 7 is supported on a vertical post 13 (Fig. 2) adjustable upwardly or downwardly by means of a hand nut 15. The block is so mounted as to permit a limited adjustment thereof about an axis extending widthwise of the machine, the construction in that respect being generally similar to that describe in Letters Patent No. 2,385,414. In order, however, to provide for greater facility in removal of the block 7 from the post 13 when it is necessary to substitute therefor a block having pins 9 which are differently spaced as required by shoes of a different range of sizes, the means for locating the block on the post is somewhat modified as compared with the disclosure of the last-mentioned Letters Patent. The block has formed in its opposite side faces arcuate guideways 17 (Fig. 7) which receive arcuate ribs 19 extending inwardly from plates 21 secured respectively on the opposite sides of a lower head portion of the post 13. Instead of the ribs and the upper walls of the guideways being continuous, as in the construction shown in the last-mentioned Letters Patent, the ribs are interrupted at 20 (Fig. 6) and the upper walls of the guideways are interrupted at 22 in such manner that while the ribs remain in the guideways over a normal range of adjusting movement of the block 7 relatively to the head portion of the post 13, by imparting extra forward movement to the block the interrupted portions of the ribs and the guideway walls may be caused to aline vertically, whereupon the block may be detached by moving it downwardly away from the head portion of the post.

For adjusting the block 7 relatively to the head portion of the post 13 there is provided a rack 25 in which is threaded an adjusting screw 27 rotatable in the head portion of the post and confined against lengthwise movement, the rack engaging a toothed segment 26 on the block. In order to limit the adjusting movement of the block, so that over the normal range of such movement the above-mentioned ribs and guideways will remain interengaged, a stop collar 29 is provided between a knob 28 on the front end of the screw 27 and the head portion of the post 13. The stop collar has an internal diameter considerably greater than the diameter of the screw, and it has thereon a radially extending stud 31 which lies between forwardly extending ears 30 (Fig. 6) on the right-hand one of the plates 21. A stud 35 extending outwardly from the collar 29 in a location diametrically opposite to the stud 31 lies in a vertical slot 36 in the left-hand plate 21 and provides means whereby the collar may be swung upwardly from a normal lowered position determined by the stud 35 and the slot 36. When the collar is in this normal position its lower portion lies in the path of movement of an upstanding portion 32 (Fig. 6) of the block 7 to limit forward movement of the block. When the collar is swung upwardly the portion 32 of the block may be moved forwardly below the collar, so that the block may be moved by the screw 27 to such a position that the interrupted portions of the ribs and guideway walls will aline with each other and thus permit the block to be removed. In mounting another block in the machine the procedure is reversed, insurance being afforded that the teeth on the rack 25 and those on the segmental portion 26 of the block will correctly intermesh. Over a considerable range of sizes and shapes of shoes to be operated upon it is usually unnecessary to replace the block 7 and only necessary to replace the plate 5 by one of different size or shape as described in Letters Patent No. 2,385,414. The screw 27 is retained in adjusted position by means of a spring-pressed pin 34 mounted in the head portion of the post 13 and having a tapered end arranged to extend into one or another of a plurality of recesses 37 in the knob 28 on the screw.

It will be understood that after the shoe has been presented in the position determined by the above-mentioned shoe-positioning means it is clamped and held in that position by upward movement of the previously mentioned toe rest 11 operated in the same general manner as disclosed in Letters Patent No. 2,160,846. Shortly after the starting of the machine, moreover, a heel rest 41 (Fig. 3) is moved rearwardly into engagement with the heel end of the shoe as also disclosed in said Letters Patent. The machine is further provided with a pair of toe-embracing wipers 43 arranged to cooperate with retarder means hereinafter described to conform the toe end of the upper to the last and to be operated thereafter to wipe the marginal portion of the upper around the toe inwardly over the feather and against the lip of the insole. These wipers are detachably mounted on wiper holders 45 (Fig. 3) and are operated by mechanisms substantially as disclosed in the last-mentioned Letters Patent for moving them heightwise of the last and for advancing and closing them, except for minor changes in the wiper-advancing cam to change somewhat the timing of the wiper-advancing operation.

Figure 9:
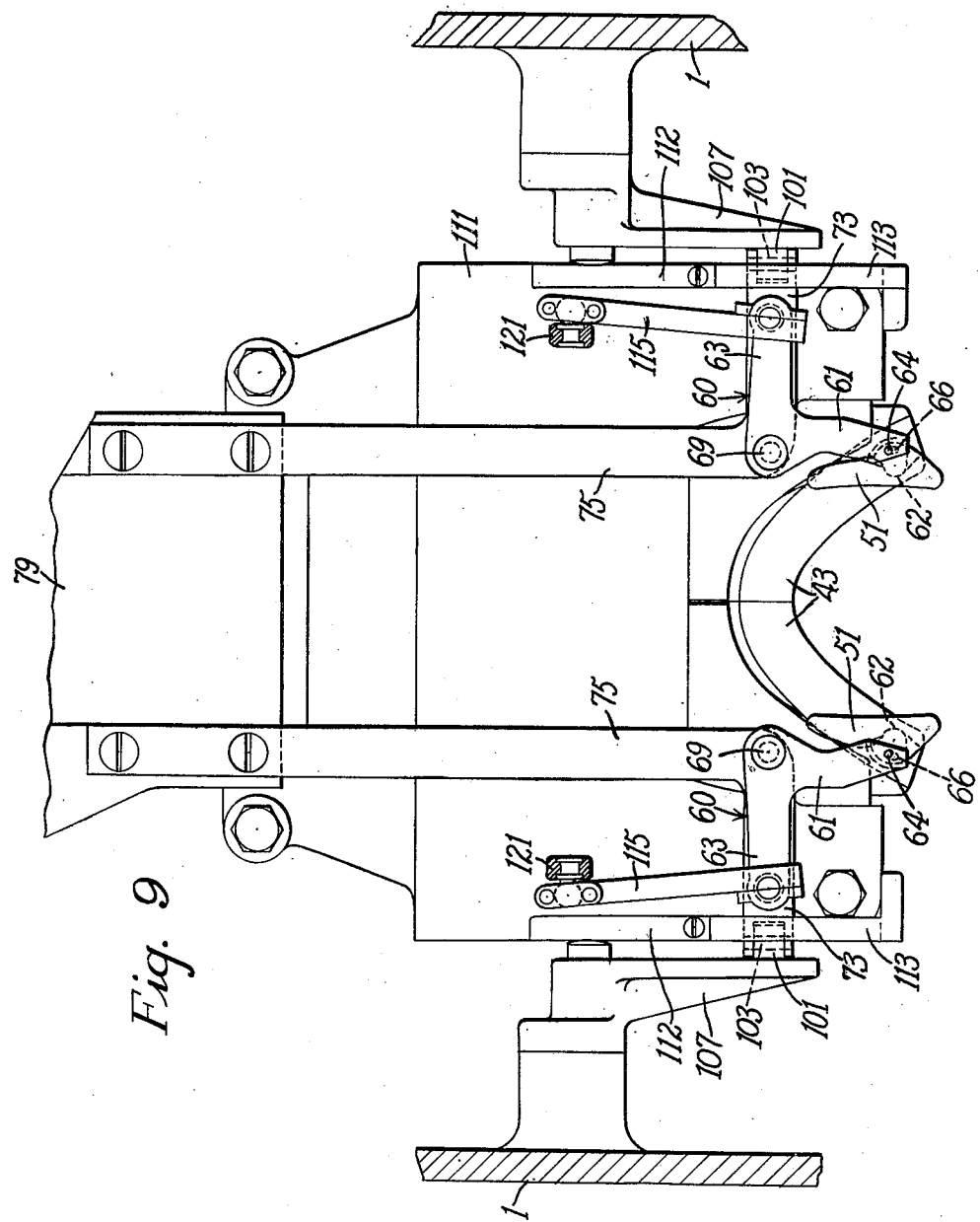
Fig. 9 is mainly a plan view of the auxiliary wipers and associated parts.

To cooperate with the wipers 43 in their action on the upper at the sides of the toe the machine herein shown is provided with auxiliary wipers 51 (Fig. 9) close to the top faces of the wipers 43; and for controlling the upper in the course of the action of the wipers 43 and 51 thereon the machine is provided with retarder means (Fig. 4) comprising a pair of main retarder fingers 53, a pair of auxiliary retarder fingers 55 and a central retarder member 56 between the fingers 53 at the extreme end of the toe. The main retarder fingers 53 are arranged to operate in locations extending from near the extreme end of the toe part way around the toe, while the auxiliary fingers 55 extend farther heelwardly along the sides of the toe to locations near the foremost side pulling-over tacks. The means whereby the retarder fingers 53 and 55 and the retarder member 56, which inclusively may be termed a retarder, are operated and controlled, will be further hereinafter described.

Figure 3:
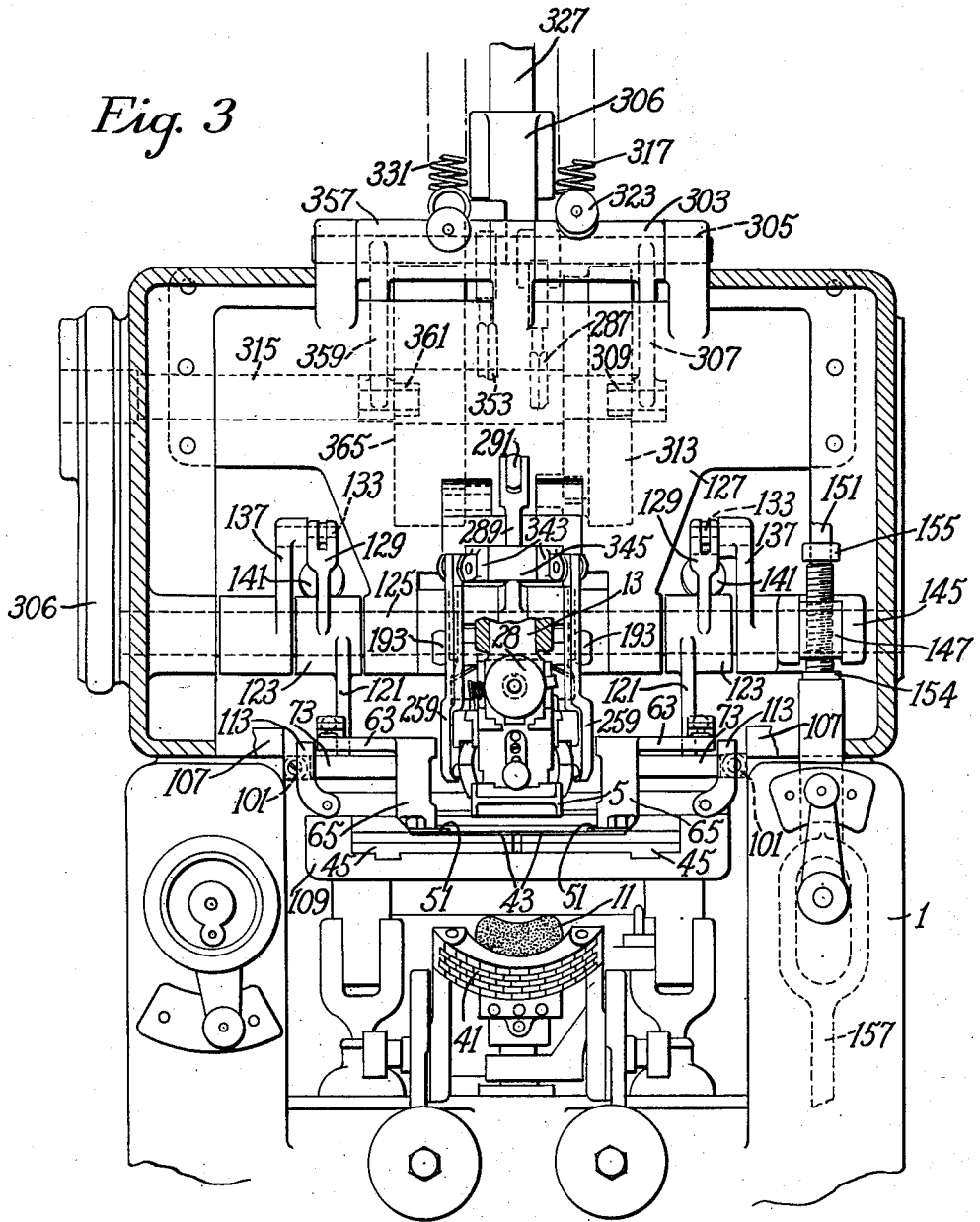
Fig. 3 is a view in front elevation of the upper portion of the machine, with parts broken away.
Figure 12:
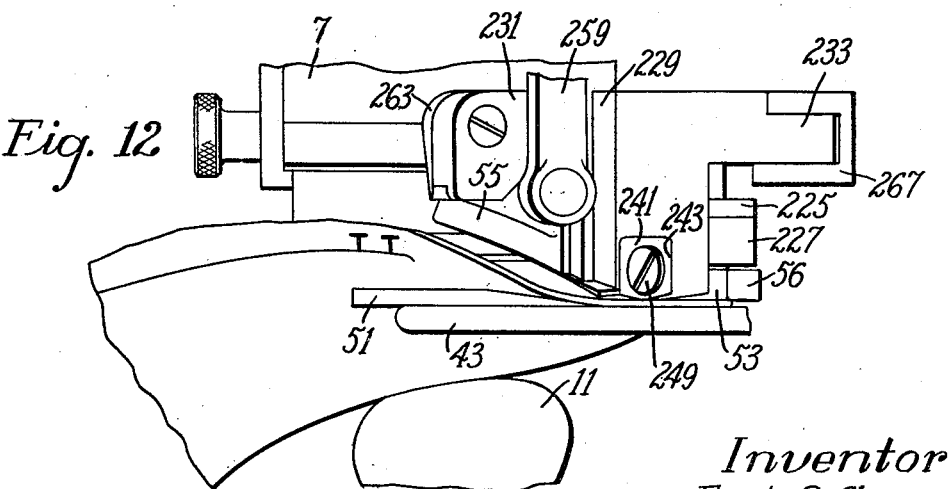
Fig. 12 is a right-hand side elevation showing the retarder means and the toe wipers as they appear at a certain time in the toe-lasting operation.

The auxiliary wipers 51 comprise thin plates elongated in directions lengthwise of the shoe and having shoe-engaging edges curved lengthwise of the shoe in approximate conformity to the curvature of the sides of the toe. The plates have outwardly extending portions which are mounted in slots formed in lower forwardly extending arms 61 (Fig. 9) of bell-crank levers 60, these bell-crank levers including upraised outwardly extending arms 63 connected to the arms 61 by yokes 65 (Fig. 3). The lower arms 61 are provided with arcuate bosses 62 extending upwardly in the slots in the arms into similarly curved recesses in the lower faces of the wipers 51. The auxiliary wipers are thus swiveled for movements relatively to the arms 61 about axes extending heightwise of the shoe. To retain the auxiliary wipers on the arms 61 there are provided pins 64 extending through bores in the arms and through arcuate slots 66 in the wipers. As shown in Fig. 12, the rear portions of the auxiliary wipers are tapered rearwardly to reduce their thickness in locations comparatively near the end of the toe.

Figure 8:
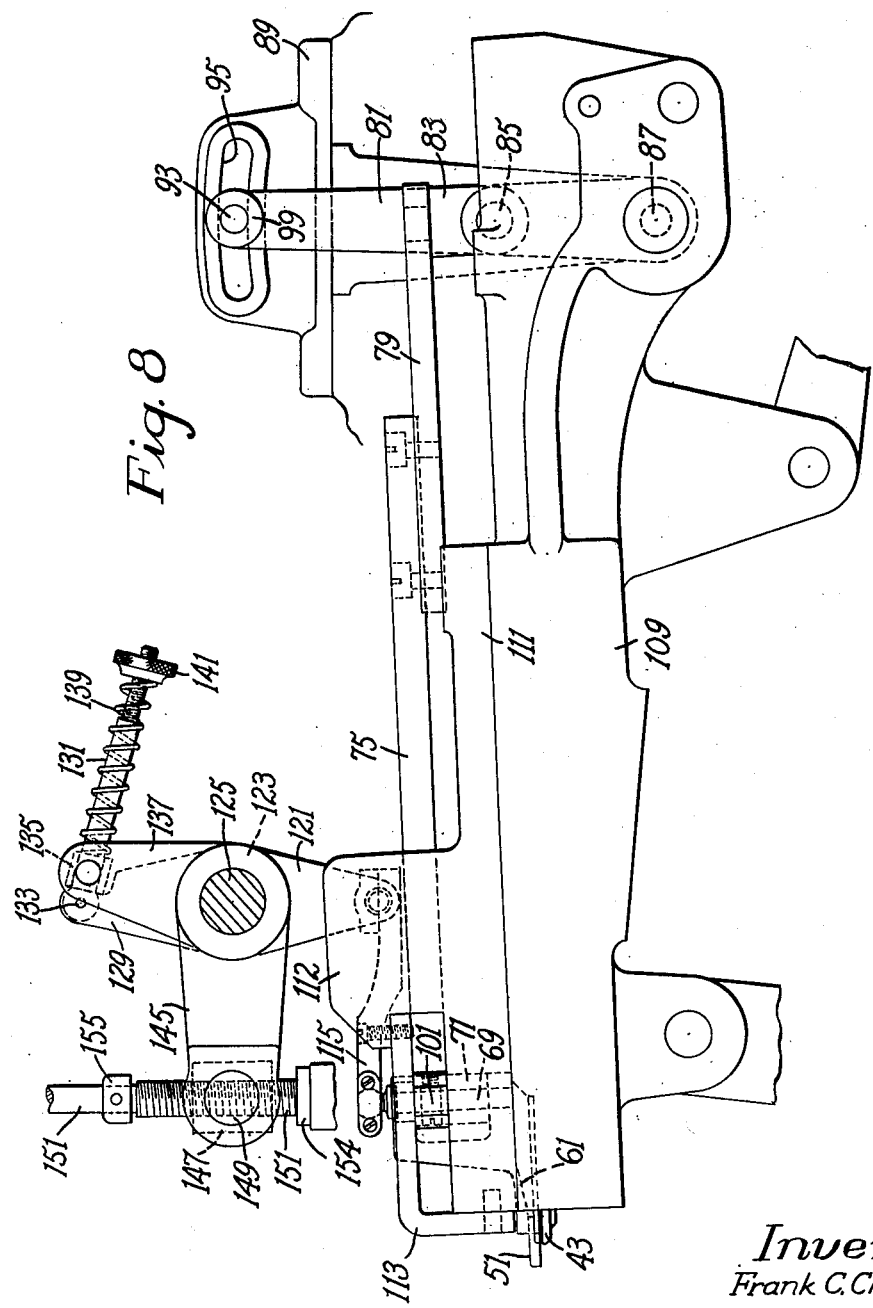
Fig. 8 is a view in right-hand side elevation showing operating and adjusting mechanisms associated with the auxiliary wipers.

The bell-crank levers 60 are pivotally mounted on upwardly and downwardly extending pins 69 mounted in alined bores in the arms 61 and 63 of the levers and also bores formed in bosses 71 (Fig. 8) on carriers 75 which are L-shaped and have at their front ends arms 73 extending outwardly widthwise of the shoe. The carriers 75, supported as hereinafter described, are secured at their rear ends to a single plate 79 the rear left-hand portion of which is connected to a hand lever 81 in a location between the upper and lower ends of the lever. For this purpose, a block 83 is secured to the lower face of the plate 79 and has fast therein a pivot pin 85 extending into a bore in the lever 81. The lever is pivotally mounted at its lower end on a pin 87 supported by a bracket 89 which extends downwardly from a cover plate 91 (Fig. 1) on the top of the main frame 1. A downwardly extending portion of the bracket 89 and a lower portion of the hand lever 81 lie within the main frame, but an upper portion of the lever extends upwardly through a slot in the cover plate 91 so as to be accessible to the operator and has secured to its upper end a stud 93. This stud extends through an arcuate slot 95 formed in an upwardly extending portion of the bracket 89 and has a clamping nut 99 threaded thereon for engaging the upwardly extending portion of the bracket and securing the lever in adjusted position. After loosening this nut the lever may be swung to effect a limited forward or rearward adjustment of the auxiliary wipers 51 relatively to the wipers 43. It will be understood that the main wipers 43 are supported for upward and downward swinging movements, as in the machine shown in Letters Patent No. 2,160,846, and the auxiliary wipers 51 swing upwardly and downwardly with them, the carriers 75 and the plate 79 swinging about the pin 85.

To support the front ends of the carriers 75 against outward movements when the auxiliary wipers 51 are forced inwardly against the sides of the toe, rolls 101 are mounted to turn on studs 103 on the outer bifurcated ends of the arms 73 and these rolls engage flat vertical faces formed on brackets 107 which are secured to the main frame 1. The wiper holders 45 on which the main wipers 43 are mounted are supported on a wiper carrier 109, mounted to swing upwardly and downwardly, under a cover plate 111 on the carrier, substantially as disclosed in Letters Patent No. 2,160,846, except that portions of the wiper holders and of the upper side of the cover plate are machined away to provide additional clearance for the auxiliary wiper mechanism. The outwardly extending arms 73 of the carriers 75 rest upon upper machined surfaces of the cover plate and are held against upward movement relatively to the cover plate by bracing members 113 which have downturned front end portions secured to the front of the cover plate. The bracing members also have rearwardly extending portions spaced from the cover plate and secured to upstanding flanges 112 on the cover plate. This arrangement provides guideways for the outer ends of the arms 73 which permit the forward and rearward adjustment of the auxiliary wipers by the hand lever 81.

Figure 1:
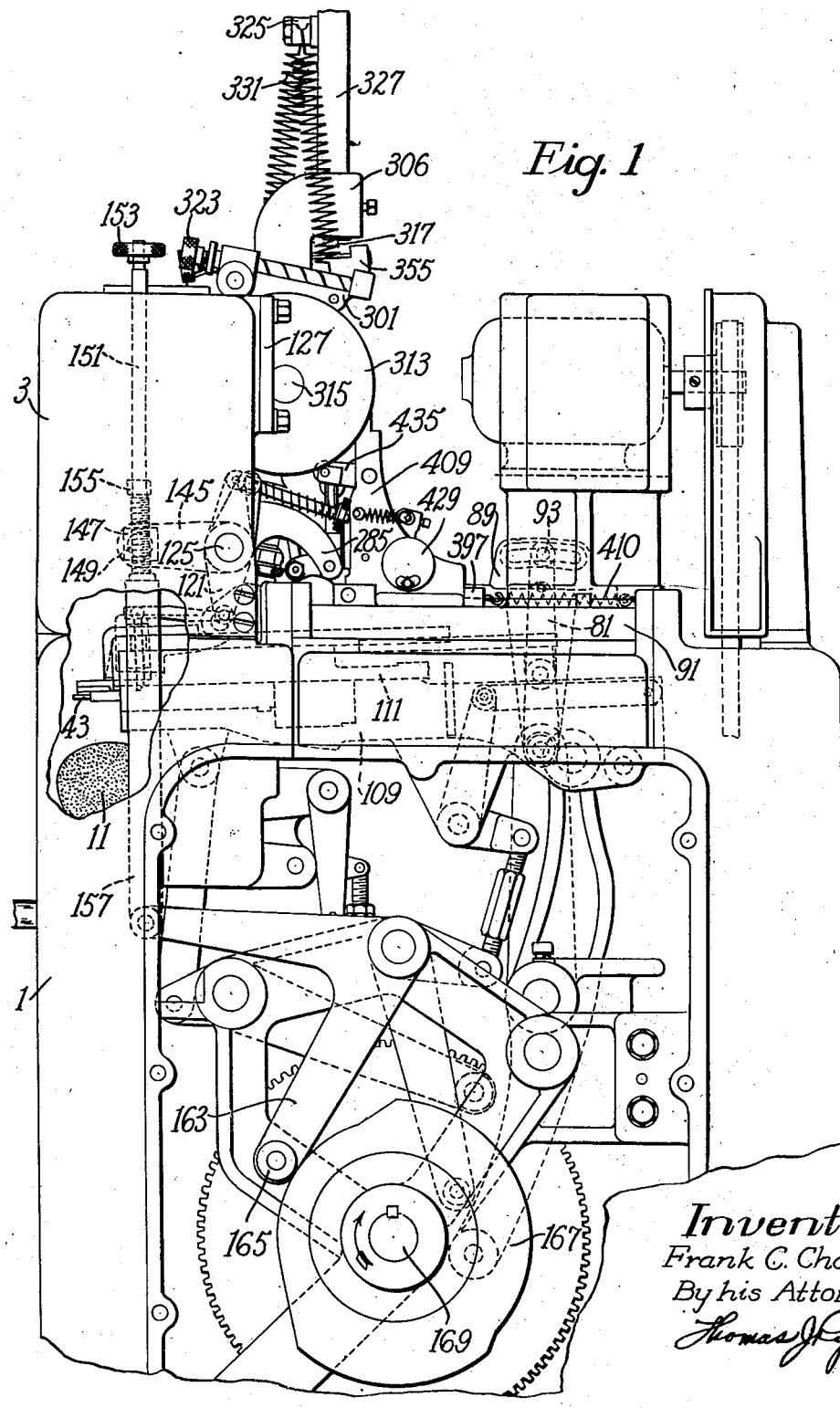
Fig. 1 is a view in right-hand side elevation of the greater portion of the machine in which the invention is herein shown as embodied, with parts broken away and certain others removed for the sake of clarity.

For operating the bell-crank levers 60 to move the auxiliary wipers 51 toward or from the shoe, the arms 63 of these levers are connected by ball-and-socket joints (Figs. 8 and 9), to front end portions of rearwardly extending links 115 which are connected at their rear ends by ball-and-socket joints to downwardly extending arms 121 of levers 123 (see also Figs. 1 and 3). These levers are mounted to swing on a shaft 125 rotatably mounted in bearings in the head casting 3 and in a bearing bracket 127 (Fig. 3) secured in the head casting. The levers 123 have upwardly extending arms 129 which are bifurcated at their upper ends to receive end portions of rods 131 (Figs. 1 and 8) pivotally mounted on pins 133 on the arms. The rods 131 extend loosely through bores in blocks 135 which are pivotally mounted on upper end portions of arms 137 secured to the shaft 125 in locations adjacent to the levers 123. Compression springs 139 are mounted on the rods 131 between the blocks 135 and hand nuts 141 threaded on rear end portions of the rods. By rotating the nuts 141, therefore, the amount of compression of the springs 139 may be varied. It will be understood that movements of the arms 137 in a clockwise direction with reference to Fig. 8 impart similar movements yieldingly through the springs 139 to the levers 123 to move the auxiliary wipers 51 inwardly toward each other. The blocks 135 are normally held by the springs 139 against machined surfaces on the arms 129, but when inward movements of the wipers 51 are stopped by the shoe the blocks move away from the arms 129 and further compress the springs 139.

For rotating the shaft 125 and thereby operating the arms 137 there is provided a lever 145 secured to the shaft, this lever being bifurcated at its front end to receive a trunnion block 147. This block is pivotally mounted on a pin 149 which extends through it and through bores in the bifurcated front end of the lever, and the block has also therein an upwardly and downwardly extending bore arranged in coaxial relation to a threaded bore extending through the pin 149 but of slightly larger diameter than the latter bore. Extending upwardly and downwardly is a rod 151, a portion of which is threaded in the bore in the pin 149. This rod extends both above and below the pin and has mounted on its upper end above the head casting 3 a knob 153 (Fig. 1) by means of which it may be turned to raise or lower the pin 149 and the block 147. Such movement of the block is limited by a stop collar 155 and a flange 154 on the rod. By means not herein shown the lower end of the rod 151 is so connected to the upper end of a downwardly extending link 157 that the rod may be turned relatively to the link but is movable upwardly or downwardly with the link. The link 157 is pivotally connected at its lower end to a forwardly extending arm of a bell-crank lever 163 (Fig. 1) a second arm of which is provided with a roll 165 engaged by the peripheral surface of a cam 167 on a main cam shaft 169 of the machine. This cam shaft corresponds to the shaft 92 shown in Letters Patent No. 2,160,846 and the lever 163 corresponds to the lever 692 shown in said Letters Patent. The cam 167 is, however, of a different shape from the cam 696 shown in said Letters Patent, although it occupies a corresponding position on the cam shaft. It will be understood that by turning the rod 151 in the manner above described, the initial positions of the auxiliary wipers 51 widthwise of the machine may be varied as required by shoes of different widths.

Figure 10:
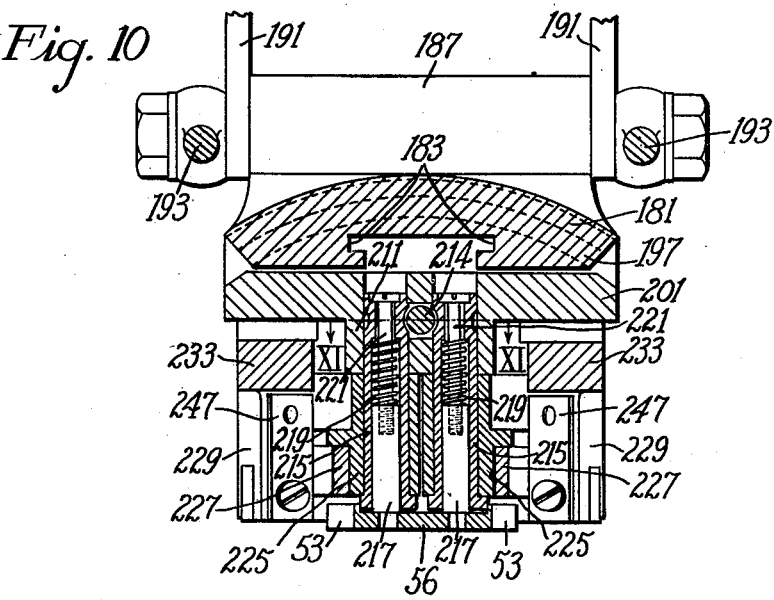
Fig. 10 is a section on the line X—X of Fig. 4.

The retarder means which cooperates with the wipers in the lasting operation, comprising the main retarder fingers 53, the auxiliary fingers 55 and the central retarder member 56, is supported by a main carrier 181 (Figs. 2, 5 and 10) which is in the form of a block having a horizontal plane lower surface provided with a T-shaped guideway 183 (Figs. 4 and 10) extending in directions lengthwise of the shoe. The upper surface of the carrier is provided, near the rear end thereof, with an upstanding bifurcated lug 185 (Fig. 5). At its front end the carrier 181 has an upwardly extending portion 187 provided with a bore extending widthwise of the machine to receive a pin 189 which extends somewhat beyond both sides of the carrier and has its opposite end portions threaded to receive washers and nuts which retain on the ends of the pin upwardly extending links 191 and rearwardly extending longer links 193 (Fig. 10). The lug 185 has pivotally connected to it the lower end of an upwardly extending link 195. The upper end portions of the links 191 and 195 are supported in the machine in a manner hereinafter described.

The carrier 181 has on its front and rear ends arcuate ribs 197 curved about a common axis located some distance below the center of the carrier. The front rib 197 is mounted in a corresponding arcuate guideway formed in an upstanding front portion 199 of a normally horizontal plate-like member 201 which is approximately square as viewed in plan. The member 201 lies just below the carrier 181 and has secured to its rear end an upstanding plate 203 having an arcuate guideway similar to the guideway in the abovementioned front portion 199 of the member. Mounted in the guideway in the plate 203 is the rear one of the arcuate ribs 197 on the carrier. The member 201 is thus supported on the carrier 181 and may rock somewhat relatively to the carrier about an axis extending in directions lengthwise of the shoe.

Figure 11:
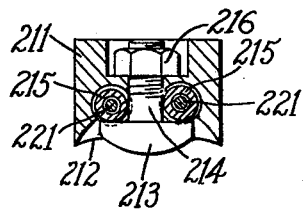
Fig. 11 is a section on the line XI—XI of Fig. 10.

The T-shaped guideway 183 (Figs. 4 and 10) in the carrier 181 has mounted therein a slide 205 which has a downwardly extending lug 207 thereon (Figs. 4 and 5) in a location near the front end of the slide. The rear end of the slide is pivotally connected to a link 209 which is connected to operating mechanism hereinafter described. The lug 207 extends downward into a substantially square aperture 210 extending vertically through the member 201 and is coupled as hereinafter described to the retarder fingers 53 and 55. The member 201 has at its front end a downwardly extending portion 211 (see particularly Figs. 10 and 11) centrally disposed widthwise of the member and lying just in front of the aperture 210. A horizontal slot 212 (Fig. 11) extending part way through the downwardly extending portion 211 from the rear face thereof opens into a bore extending rearwardly from the front face thereof. Mounted in the slot 212 is a retaining member 213 having a threaded stem 214 and a nut 216 thereon engaging a shoulder on the portion 211. The retaining member 213 serves to secure in place upper end portions of sleeves 215 which extend downwardly through bores in the member 201, these sleeves being arranged closely adjacent to each other. Mounted in the sleeves 215 are plungers 217 (Fig. 10) secured to and extending upwardly from the central retarder member 56. Compression springs 219 surround the stems of headed screws 221 which are threaded in the upper end portions of the plungers 217, the upper ends of the springs being seated against shoulders on the sleeves 215. The springs thus tend to move the retarder member 56 in a downward direction relatively to the sleeves 215, its downward movement being limited by engagement of the heads of the screws 221 with the sleeves. Accordingly, the member 56 may yield a short distance in an upward direction against the resistance of the springs 219 in response to pressure of the upper against it.

The main retarder fingers 53, as shown in Fig. 4, are provided in their opposite ends with arcuate recesses extending widthwise of the fingers. Extending into the recesses in the rear ends of the fingers are rounded end portions of the central retarder member 56, which thus forms knuckle joints with the fingers while permitting a limited amount of rocking movement of the fingers relatively to the central member about horizontal axes. The fingers 53 have thereon upwardly extending lugs 223 (Figs. 4 and 5) which, as viewed from the sides of the fingers, are substantially cylindrical in form. These lugs lie within complementally shaped recesses extending part way through lower portions of arms 225 which support the fingers, the lugs being retained within the recesses by means of cover plates 227 secured to the outer faces of the arms. The lugs 223 and the complemental recesses in the arms thus afford provision for the abovementioned rocking movements of the fingers relatively to the central member 56 to permit the fingers to adjust themselves to the upper, such movements of the fingers being limited by engagement of their upper faces with the arms. The arms 225 are pivotally mounted at their rear ends on the previously mentioned sleeves 215 (Fig. 10) for swinging movements about the sleeves.

For supporting the auxiliary retarder fingers 55 there are provided blocks 229 (Figs. 4 and 5) having forwardly extending arms 231 and rearwardly and outwardly extending arms 233. The blocks are further provided with inwardly extending ears 235 spaced vertically apart, and between these ears are mounted lugs extending forwardly from the arms 225 which carry the fingers 53. Pivot pins 237 extend through the ears 235 and the above-mentioned lugs, so that the arms 225 and the blocks 229 may swing relatively to each other about substantially vertical axes. The blocks 229 are further provided with substantially vertical bores in which are mounted plungers 239, these plungers at their lower ends being provided with heads 241 mounted in slots 243 in the blocks and having plane parallel front and rear faces guided by engagement with the walls of the slots. This arrangement permits upward and downward movements of the plungers 239 relatively to the blocks 229 but prevents turning of the plungers. Such movements of the plungers are limited to a distance of approximately one-quarter of an inch by pins 245

(Fig. 5) mounted in the blocks 229 and extending into recesses formed in the plungers. The pins are held yieldingly in engagement with the plungers by leaf springs 247 secured to rear faces of the blocks 229, and the friction between the pins and the plungers prevents movement of the plungers relatively to the blocks at times in the course of the operation of the machine. The fingers 55 are pivotally mounted on the heads 241 of the plungers 239 by means of horizontal pivot studs 249 extending through bores in the heads and threaded into side walls of the fingers. The rear end portions of the fingers 55 are rounded laterally and also upwardly and downwardly and extend into the arcuate recesses in the front ends of the fingers 53, thus forming loose knuckle joints with the fingers 53.

The fingers 55 (Fig. 4) are comparatively long and are curved slightly lengthwise of the shoe on their inner faces. At their front ends, moreover, they are comparatively thin widthwise to facilitate the introduction of these ends between the upper materials and the lip of a welt shoe insole. The fingers 55 have thereon upwardly extending lugs 251 (Fig. 5) so formed as to present front faces perpendicular to the lower faces of the fingers and rear faces 255 inclined in rearward and downward directions relatively to the front faces. Engagement of the faces 255 with front vertical faces 257 on the upper ones of the ears 235 on the blocks 229 limits upward swinging movements of the fingers 55 about the studs 249.

For controlling the fingers 55 there are provided links 259 extending upwardly therefrom and connected at their lower ends to the lugs 251 by ball-and-socket joints, the balls being mounted in sockets in the lugs and retained therein by cover plates 261. The upper ends of the links are connected to operating mechanism hereinafter described. Guide plates 263 secured to inwardly extending lugs on the front ends of the arms 231 provide, with inner walls of the arms, guideways for upper end portions of the lugs 251 and the cover plates 261.

The arms 233 of the blocks 229 are pivotally connected at their rear ends by pins 265 (Fig. 4) to arms 267 of two-armed levers 268 which are pivotally mounted between their ends on studs 269 threaded in the lower side of the member 201. The other arms 271 of the levers have rotatably mounted therein pins 273 head portions of which are slotted laterally to receive the previously mentioned lug 207 on the slide 205, the head portions of the pins extending upwardly into the aperture 210 in the member 201. Movement of the slide 205 forwardly in the carrier 181 from its rearmost position moves the pins 273 also forwardly, thereby swinging the levers 268 in directions to carry the rear ends of the arms 233 rearwardly and outwardly. This causes the fingers 53 and 55 to swing outwardly widthwise of the shoe as more particularly hereinafter explained, the fingers 53 swinging about the axes of the sleeves 215 and the fingers 55 also swinging outwardly with the fingers 53 while assuming a slightly different relation to them about the axes of the pins 237.

Upper end portions of the links 191 supporting the front end of the carrier 181 are pivotally connected by a rod 279 to a bifurcated forwardly extending arm 281 (Fig. 2) of a two-armed lever 283 pivotally mounted on the shaft 125. The lever 283 has a second rearwardly and downwardly extending arm 285 pivotally connected at its rear end to the lower end of a link 287. Also pivotally mounted on the rod 279 between the bifurcations of the arm 281 is a bell-crank lever 288 having an upwardly extending arm 289 pivotally connected to the front end of a rearwardly extending link 291 which at its rear end is pivotally connected by a stud 293 to the previously mentioned bracket 127. The effective lengths of the link 291 and the arm 281 are equal, and the link 291 is parallel to an imaginary line passing through the centers of the shaft 125 and the rod 279. A rearwardly extending arm 295 of the bell-crank lever 288 is pivotally connected to the upper end of the link 195 supporting the rear portion of the carrier 181. The links 191 and 195 are of equal lengths and are parallel, while the arm 295 is effectively parallel to a line passing through the pivotal connections between the links 191, 195 and the carrier 181. Accordingly, a parallel linkage arrangement is provided, which insures that as the lever 283 is swung about the shaft 125 the lower plane of the carrier 181 supporting the retarder finger 53 and 55 and the central retarder member 56 remains horizontal. In order to control the carrier 181 with respect to forward and rearward movements, the links 193 are pivotally connected at their rear ends to the lower ends of arms 297 extending downwardly from a sleeve 299 (Fig. 2) pivotally mounted on the shaft 125. The effective lengths of the arms 297 are the same as those of the links 191 and 195, and the effective lengths of the links 193 are the same as those of the link 291 and the arm 281. Counterclockwise movement, with respect to Fig. 2, of the arms 297 about the shaft 125 will, through the links 193, move the carrier 181 and the retarder members carried thereby bodily in a rearward direction, the parallel linkage insuring that the carrier remains horizontal throughout that movement.

For swinging the lever 283 about the shaft 125 to move the carrier 181 upwardly and downwardly, the link 287 is pivotally connected at its upper end to an arm 301 (Fig. 2) extending rearwardly from a yoke member 303 (see Fig. 3) pivotally mounted on a transverse shaft 305 supported in bearings in the bracket 127. The yoke member has a downwardly extending arm 307 formed thereon, the arms 301 and 307 being spaced apart widthwise of the machine. At its lower end the arm 307 has thereon a cam roll 309 in engagement with a cam surface on a cam 313 secured to a cam shaft 315 which extends widthwise of the machine and is rotatable in bearing brackets 306 (Fig. 3), this cam shaft being driven by a chain (not shown) from the cam shaft 169. The roll 309 is held normally against the cam surface by the action of a spring 317, a lower end portion of which is anchored in a helical groove formed on a rod 321 journaled in bearings in the arm 301 and provided at its front end with a knurled head 323 by which it may be rotated. The rod 321 is held against lengthwise movement in its bearings, so that when it is rotated the lower end of the spring is adjusted lengthwise of the arm 301 to vary the leverage by which the spring acts on the arm. The upper end of the spring is connected to one end of a balancing lever 325 pivotally mounted midway between its opposite ends on a stud secured to a post 327 extending upwardly from the right-hand bracket 306. The lever 325 has a similar spring 331 connected to its other end, the lower end of this spring being connected to another adjusting device similar to the one above described but associated with other cam-controlled mechanism hereinafter described. Under the action of the spring 317 the cam roll 309 follows the cam surface on the cam 313, and the retarder means is moved bodily downward in response to counterclockwise movement, with reference to Fig. 2, of the arms 301 and 307. In the construction shown in Figs. 1 and 2 downward movement of the carrier 181 is limited only by engagement of the retarder fingers 53 with the upper material lying over the wipers and, as the cam 313 continues to rotate, the roll 309 is separated from the cam surface on the cam. While the fingers 53 are in engagement with the work, the amount of downward pressure thereof on the work is determined by the setting of the adjusting device associated with the spring 317.

For controlling movements of the auxiliary retarder fingers 55 about the pivot studs 249 relatively to the fingers 53 and the pressure applied to the work by the auxiliary fingers, the links 259 are pivotally connected at their upper ends by means of studs 341 to the front end portions of members 343 which extend rearwardly and inwardly and are secured to a forwardly extending arm 345 of a two-armed lever 347 pivotally mounted on a pin 349 on the bracket 127. The lever 347 has a rearwardly extending arm 351 pivotally connected at its rear end to the lower end of an upwardly extending link 353. The upper end of this link is pivotally connected to an arm 355 extending rearwardly from a yoke member 357 pivotally mounted on the shaft 305 at the left of the yoke member 303 (Fig. 3). The yoke member 357 has a downwardly extending arm 359, the arms 355 and 359 being spaced apart widthwise of the machine. The arm 359 carries a cam roll 361 which is held normally in engagement with a cam surface on a cam 365 secured to the cam shaft 315 by the action of the previously mentioned spring 331 on the arm 355. As above suggested, this arm carries a spring-adjusting device similar to that carried by the arm 301 and having the lower end of the spring 331 connected thereto.

For swinging the arms 297 carried by the sleeve 299 about the shaft 125, the sleeve 299 has thereon a rearwardly extending lug 371 (Fig. 2) provided with a transverse bore in which is rotatably mounted a pin 373. A head 374 on one end of this pin is bifurcated to receive between its bifurcations a sleeve 375 extending upwardly from a knurled nut 376 which is threaded on a stem formed on the lower end of an upwardly extending link 377. The sleeve 375 is provided with a flange 378 extending over the head 374. The upper end of the link 377 is pivotally connected to a lever 379 pivotally mounted on the stud 293 and having thereon a cam roll 381 lying in a cam track in the cam 313. By rotating the nut 376 the effective length of the link 377 may be varied to adjust the carrier 181 in directions lengthwise of the shoe.

For operating the link 209 connected to the slide 205 controlling the outward swinging movements of the retarder fingers, the link is pivotally connected at its rear end to a downwardly extending arm of a bell-crank lever 391 pivotally mounted on a pin 393 which is supported in a head 395 formed on a slide 397. The bell-crank lever has a forwardly extending arm 399 connected by a link 401 to a cam lever 403 also mounted on the stud 293. The cam lever 403 is provided with a roll 405 lying in a cam track in the cam 365 (Fig. 3). The slide 397 is mounted in a forwardly and rearwardly extending guideway in a bracket 409 secured to the cover plate 91 on the top of the main frame 1. The slide is normally urged in a rearward direction by a spring 410 (Fig. 1) connected to its rear end and to a hook on the cover plate 91. The arrangement is, accordingly, such that prior to the beginning of the cycle of operations this spring, by its action on the slide 397, tends to move the bell-crank lever 391 bodily in a rearward direction and thereby, through the link 209 and the slide 205, tends to swing the levers 268 in directions to cause the front ends of the fingers 55 yieldingly to engage the side walls of the shoe-positioning plate 5 above the lip of the insole. When the operator wishes to substitute for the plate 5 one of a different size or shape, he swings the fingers apart against the resistance of the spring 410, and after the substitute plate has been placed in the machine and the fingers have been released, the front ends of the fingers 55 will hug the side walls of the plate regardless of its size or shape within the range of substitute plates provided for use in the machine. The fingers, therefore, will of themselves assume positions proper for operating on the next shoe.

In order to insure that the retarder fingers will receive measured outward movements from whatever initial positions against the plate 5 the fingers 55 occupy at the beginning of the cycle of operations, means is provided for locking the slide 397 in its guideway in the bracket 409 immediately after the beginning of the rotation of the cam shaft 315, so that thereafter the pivot 393 for the bell-crank lever 391 will be held stationary and the movements of the cam lever 403 will be positively transmitted to operate the fingers 53 and 55. This locking means comprises a locking lever 413 pivotally mounted on an eccentrically mounted pin 415 on the bracket 409. The lever 413 has a rounded lower end face arranged to engage an upper face of a hardened plate 419 mounted in a recess in the slide 397. The plate 419 rests upon a plate 423 which has lugs extending widthwise of the machine into vertical slots 424 in the bracket 409 at both sides of the guideway for the slide 397. The plate 423 rests upon a plate 425 in the recess in the slide, and this plate rests upon another plate 427 having lugs extending into the slots 424. The plates 423 and 427 are thus held against forward or rearward movements by their lugs and the slots 424, while the plates 419 and 425 are caused by the recess in the slide 397 to move with the slide. The eccentric pin 415 has thereon a head 429 by which it may be rotated, the head 429 being normally held in adjusted position by a screw 430 extending through a slot in the head and threaded in the bracket 409. The adjustment is such that the lever 413, on being swung in a counterclockwise direction from the position in which it is shown in Fig. 2, clamps the plates 419, 423, 425 and 427 firmly together to hold the slide 397 against movement.

The lever 413 is controlled by a cam surface on the cam 313. This cam surface is engaged by a cam roll 433 mounted on a forwardly extending arm of a bell-crank lever 435 which is pivotally mounted on a pin 437 on the bracket 409. The bell-crank lever has a depending arm which, at its lower end, carries a hardened abutment plate 439. A spring 440 connected to the forwardly extending arm of the bell-crank lever and to a pin 442 on the bracket 409 tends to swing the lever in a clockwise direction. An arm 441 is pivotally mounted on an upper arm 443 of the locking lever 413 and has in its front end a notch (not shown) providing a vertical abutment face and a horizontal face. The vertical face is normally held in abutting engagement with a rear face of the abutment plate 439 under the action of a spring 449 connected to a pin on the arm 443 and a pin on the bracket 409. The above-mentioned horizontal face of the arm 441 lies just below the abutment plate 439, while a lower face of a downwardly extending lug 455 on the arm is held normally in engagement with the upper end of a catch plate 457 by a spring 459 connected to the arm 441 and to a rearwardly projecting pin on the catch plate. The latter is pivoted on a pin 463 mounted in the bracket 409 and is urged by the spring 459 in a counterclockwise direction so that the front face thereof engages a stop face on the bracket, as shown in Fig. 2.

Figure 2:
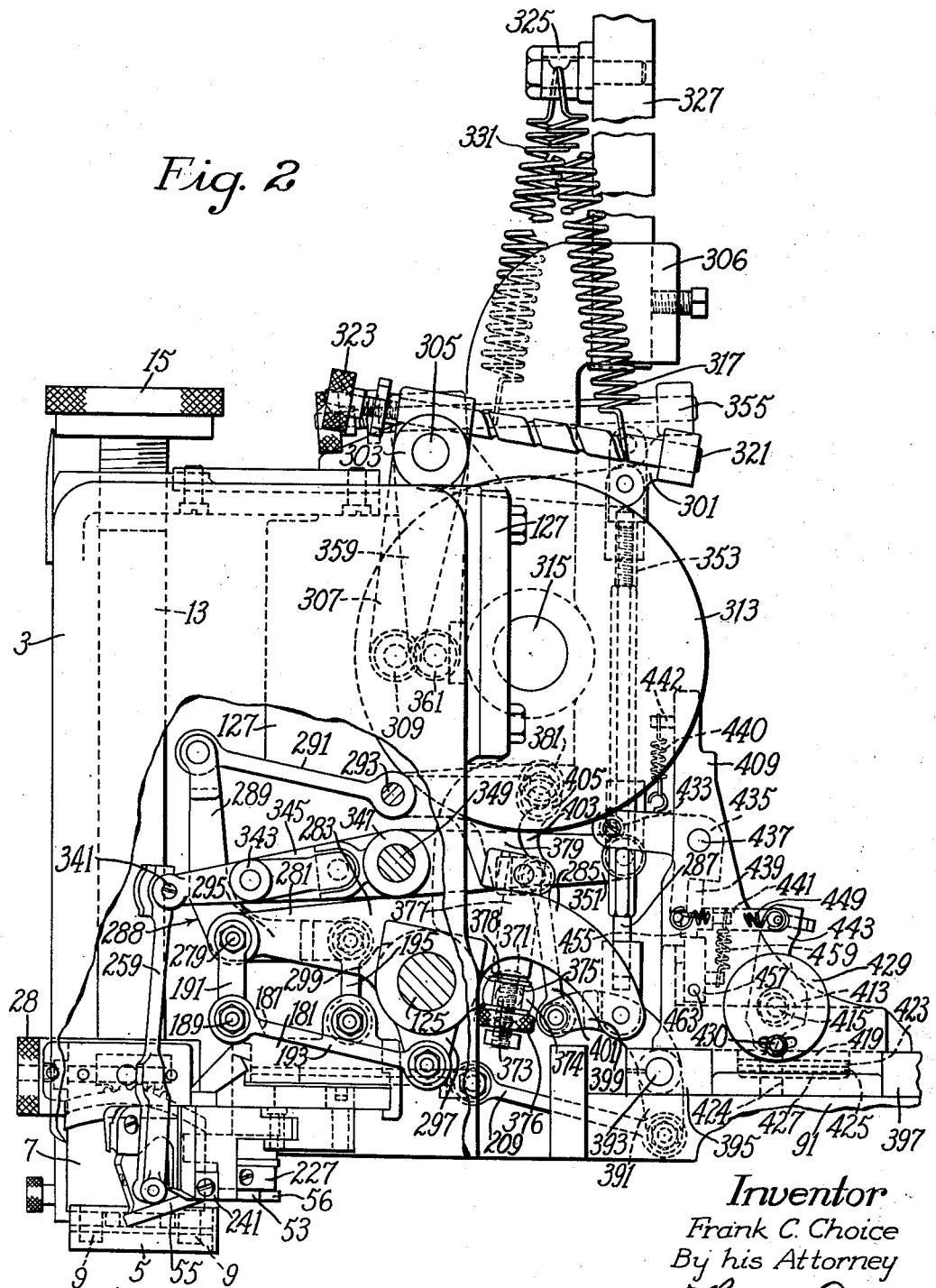
Fig. 2 is a view similar to Fig. 1 on a larger scale of the main upper portion of the machine, with parts broken away.

Prior to the beginning of the cycle of operations the cam roll 433 is engaged by a high part of the cam and the parts occupy the positions shown in Fig. 2 with the locking lever 413 held inoperative, so that the slide 397 is free to move in its guideway in the bracket 409. Within the first 10° of rotation of the cam shaft the roll rides off the high part of the cam, whereupon the spring 449 swings the locking lever 413 in a counterclockwise direction to cause the locking plates to be pressed together and thereby to lock the slide 397 against movement. If the eccentric pin 415 is correctly adjusted, the forward movement of the arm 441 which occurs at this time is insufficient to cause its lug 455 to drop in front of the catch plate 457, and accordingly when the lever 435 is swung in a counterclockwise direction near the end of the cycle of operations by the action of the high part of the cam on the roll 433, the abutment plate 439 pushes the arm rearwardly and thereby causes the lever 413 to unlock the slide 397. If, however, because of eventual wear of the locking plates or of the lever 413, this lever swings so far that the lug 455 drops in front of the catch plate 457, the arm 441 is lowered to such an extent that its vertical abutment face will not be engaged by the abutment plate 439 when the lever 435 is swung counterclockwise at the end of the cycle. Under these circumstances the slide 397 is not unlocked and the operator will find that when he next attempts to move the fingers 55 apart to permit him to change the plate 5, he is unable to do so. An indication will thereby be afforded that the locking device should be adjusted or the worn parts should be replaced.

In order to minimize the possibility of damage to the auxiliary wipers 51 if the machine should be run idly without any shoe therein, alternative means shown in Figs. 15 and 16 is provided for connecting the link 157 (Fig. 1) with a cam-operated lever for operating it. The possibility of such damage arises from the fact that when there is no shoe in the machine the toe rest 11 is moved farther upwardly than when a shoe is present. If the auxiliary wipers, under these conditions, are allowed to move inwardly in the same manner as when there is a shoe in the machine, they may engage the rubber pad of the toe rest and thereafter, as they rise, may snap inwardly over the top of the toe rest to such an extent that portions of them will extend inwardly under the flange of the shoe-positioning plate 5. This may cause the auxiliary wipers to be broken as they are moved farther upward during the upward movements of the main wipers. The alternative means above referred to provides a safety device which prevents the auxiliary wipers from being moved far enough inwardly to be trapped beneath the flange of the plate 5 if the machine is run without any shoe therein. For the purpose in view, the bell-crank lever 163 shown in Fig. 1 is replaced by two levers and a latch device (Fig. 15), the latch device normally acting to transmit movement from one of the levers to the other to impart inward movements to the auxiliary wipers. The two levers comprise a lever 501 connected to the link 157 by a pin 513 and mounted to swing about a shaft 503, and a lever 505 also mounted to swing about the shaft 503 and having thereon a cam roll 507 arranged to be engaged by a peripheral cam 509 on the cam shaft 169. The shape of the cam 509 is somewhat modified, as hereinafter described, as compared with that of the cam 167 shown in Fig. 1.

The above-mentioned latch device comprises a bell-crank lever 511 pivotally mounted on the pin 513. One arm of this bell-crank lever is provided with a hardened block 515 arranged to be engaged, when there is a shoe in the machine, by a second hardened block 517 on the lever 505. Counterclockwise movement, with reference to Fig. 15, of the lever 501 is arrested by engagement of an adjustable stop screw 519 on the lever with an abutment face 521 on the machine frame. The stop screw 519 is so adjusted that at the end of the cycle of operations the block 515 is just clear of the block 517, as shown in Fig. 15.

Counterclockwise movement of the lever 501 is effected by engagement of an adjustable stop screw 520 mounted in a lug on the lever 505 with a lug 522 on the lever 501, the weight of the lever 505 being depended upon thus to move the lever 501. The screw 520 is so adjusted that when movement of the lever 501 is arrested by the stop screw 519 and the cam roll 507 is in initial engagement with the cam 509, the screw 520 remains in engagement with the lug 522.

A forwardly extending arm 523 of the bell-crank lever 511 is connected by a link 525 with an arm 527 extending forwardly from a sleeve member 529 pivotally mounted on a shaft 531 supported by the machine frame. Collars 533 (Fig. 16) restrain the sleeve member 529 from lengthwise movement on the shaft. The sleeve member has thereon a second forwardly extending arm 535, this arm being pivotally connected at its front end to an upwardly extending link 537. The link 537 has therein an upwardly and downwardly extending slot 539, and in this slot lies a pin 541 carried by a block 543 secured to the lower end portion of a rod 545 which at its upper end carries the toe rest 11. This rod corresponds to the rod 38 shown in Letters Patent No. 2,160,846.

Since in the cycle of operations the toe rest does not move so far upwardly, as a result of the upward movement of the rod 545, if there is a shoe in the machine as it does if the machine is run idly without any shoe therein, this fact is utilized to determine whether or not the safety device associated with the auxiliary wiper-operating mechanism is operative. The pin 541 assumes a position lengthwise of the slot 539 determined by the height to which the toe rest rises, and when there is a shoe in the machine the pin does not rise far enough to engage the link 537 at the top end of the slot and thereby to raise the link 525. Under these conditions the bell-crank lever 511 remains in the position shown in Fig. 15 relatively to the lever 501, the weight of parts connected thereto maintaining it with a rear face on its lower end in engagement with the block 517. In the cycle of operations, therefore, clockwise movement of the lever 505 imparts similar movement to the lever 501 to cause the auxiliary wipers to receive their normal inward movements.

If the machine is run idly without any shoe therein, the rod 545 which carries the toe rest moves upwardly so far that the pin 541 raises the link 537 and thereby raises the link 525 to such an extent as to swing the bell-crank lever 511 far enough to carry its block 515 away from over the block 517. Under these conditions clockwise movement of the cam-operated lever 505 does not impart movement to the lever 501 until the head of a screw 547 on the lever 505 engages the lower face of the lug 522 on the lever 501. Because of this lost motion the extent of the inward movements imparted to the auxiliary wipers is much less than would otherwise be the case, such short inward movements as are imparted to them serving to prevent their outer faces from being engaged by the wiper carriers 45 for the main wipers 43 with possible danger of damage. Accordingly, the auxiliary wipers are not moved inwardly far enough to become trapped beneath the shoe-positioning plate 5.

When the machine is to operate on shoes having uppers of certain materials, it may be desirable to limit downward movement of the carrier 181, so that the upper will not be clamped so soon on the wipers by the retarder fingers 53 and the member 56 as the wipers are moved upwardly, thus limiting the duration and extent of the pull on the upper by the cooperative action of the wipers and the retarder fingers and member 56. For this purpose there may be provided a stop device shown in Figs. 13 and 14. This stop device includes a bracket 561 clamped on the post 327, the bracket having a portion extending downwardly behind the post. Formed in the bracket is a vertical bore in which is mounted a stem 563 extending upwardly from a crosspiece 565, and threaded on the upper end portion of this stem is a knurled nut 575. This nut is mounted in a slot in the bracket 561 so that, when it is rotated, the crosspiece 565 is raised or lowered. Rotation of the stem 563 in the bore is prevented by a key 567 secured to the crosspiece and extending upwardly into a groove 569 in the bracket. The crosspiece carries a depending pin 571 and an adjustable stop screw 573. The screw may be adjusted upwardly or downwardly in the crosspiece relatively to the pin 571, and both the pin and the screw may be similarly adjusted together by rotation of the nut 575. Downward movement of the stem 563 and therefore of the crosspiece is limited by engagement of a collar 577 on the stem with the bracket 561. The stop screw 573 is arranged to limit downward movements of the main retarder fingers 53 and the central retarder member 56 by engagement with the rear end of the arm 301, and the pin 571 serves to limit downward swinging movements of the auxiliary retarder fingers 55 about the pivot studs 249 by engagement with the rear end of the arm 355.

Before presenting a shoe to the machine the operator makes certain that the shoe-positioning plate 5 is of the correct size and shape and that the various mechanisms capable of adjustment are so adjusted that the instrumentalities controlled thereby will operate properly on the work in hand. A shoe, before it is presented to the machine, will have been previously pulled over and side lasted, and the operator removes the end pulling-over tack and spreads outwardly with his fingers the marginal portion of the upper around the toe so that it is spaced somewhat from the lip of the insole. In locations, however, adjacent to the forward ones of the side pulling-over tacks the margin of the upper will lie fairly close to the lip of the insole and will, in general, extend somewhat above the level of the lip. The operator presents the shoe bottom upward to the machine and causes the flange of the plate 5 to engage the inner face of the insole lip and thereby to position the shoe lengthwise and laterally. The tips of the auxiliary retarder fingers 55 will then lie just above the insole lip in locations slightly nearer the end of the toe than the foremost side pulling-over tacks, the fingers being inclined downwardly and toward the operator, i. e., toward the heel end of the shoe, at this time. The tips of these fingers will be yieldingly engaging the side walls of the plate 5 and, as the shoe is presented, portions of the upper materials extending upwardly above the level of the insole lip will lie against the outer faces of the tips of the fingers.

The timing of the different operations will be described with reference to the chart (Fig. 17) and with reference, in part, to the chart shown in Fig. 33 of Letters Patent No. 2,160,846. It is to be noted, however, that the machine herein shown comes automatically to a stop the first time at about 175° of the cycle instead of at about 190° as indicated on the last-mentioned chart. After the shoe has been properly presented, the operator initiates the cycle of operations by depression of the starting treadle. Near the beginning of the cycle the cam roll 433 (Fig. 2) on the bell-crank lever 435 rides off the high part of the cam surface which it engages, thus causing the slide 397 to be locked in its guideway in the bracket 409 by the locking lever 413 (line A on the chart), so that thereafter the retarder fingers 53 and 55 will be positively controlled through the bell-crank lever 391. The toe rest 11 also is raised near the beginning of the cycle to clamp the shoe against the pins 9 (Figs. 6 and 7), the plate 5 yielding in an upward direction until the shoe engages the pins.

In the machine herein shown the wiper carrier 109 begins to advance at about 20° of the cycle instead of 50° as in the machine of Letters Patent No. 2,160,846, and this initial advance is completed at about 60° instead of 100°. This earlier advance of the wipers insures that they will be positioned beneath the retarder means at an earlier stage than in the machine equipped with the retarder shown in the previously mentioned Letters Patent No. 2,380,407, thus minimizing any tendency for the retarder means as it descends to crowd the upper down in front of the wipers.

The cam surface engaging the roll 309 (Fig. 2) is so shaped that the carrier 181 for the retarder means begins to move downwardly under the action of the spring 317 at about 20° of the cycle (see line B on the chart). The fingers 53 and the member 56 are thus moved bodily downward, and with them to pivot studs 249 (Fig. 5) for the auxiliary fingers 55. In order to maintain the tips of the fingers 55 substantially at their initial height as their rear ends move down with the fingers 53, the links 259 are at this time moved downward somewhat, as permitted by the cam surface engaging the roll 361 (line C on the chart). Early in the downward movement of the carrier 181, moreover, the fingers 53 and 55 are swung very slightly outward by forward movement of the slide 205 in response to movement of the bell-crank lever 391 to prevent the tips of the fingers 55 from binding against the side walls of the plate 5 (line D on the chart).

As downward movement of the carrier 181 continues, the lower faces of the fingers 53 and 55 and the member 56 assume substantially a common horizontal plane at a level just above the lip of the insole. At this stage of the downward movement of the carrier, beginning near 30° of the cycle, the cam track acting on the roll 405 swings the lever 403 farther counterclockwise with reference to Fig. 2 a measured distance and thus causes the bell-crank lever 391 to move the slide 205 farther forwardly (toward the left in Fig. 2). By this means the fingers 53 and 55 are swung a definite distance outwardly widthwise of the shoe to insure that in further downward movement of the carrier 181 the fingers 55 will not engage the lip of the insole. The movements imparted to the fingers at this time are only sufficient to carry the tips of the fingers 55 outwardly about three sixteenths of an inch. In further downward movement of the carrier the tips of the fingers 55 are maintained at substantially their initial height while their rear ends descend with the fingers 53. When the lower faces of the fingers 53 are near the general level of the toe end of the insole, all the fingers are swung farther outward and, together with the member 56, are moved bodily rearward a definite distance to clear the edge of the insole. These movements of the fingers and the member 56 result from rearward movement of the carrier 181 relatively to the slide 205 (see line E on the chart). It will be understood that the carrier is thus moved rearwardly through the links 193 (Fig. 2) by the cam-operated lever 379, and that since the slide 205 is held stationary at this time the rearward movements of the pivot studs 269 (Fig. 4) cause the levers 268 to swing in the directions to move the fingers outwardly. In this operation the margin of the upper is spread farther outwardly over the wipers. Downward movement of the carrier continues until the fingers 53 and the member 56 have descended, for example, about three eights of an inch below the level of the toe end of the insole, whereupon they clamp the outspread margin of the upper against the upper faces of the wipers 43 which by this time are beginning their upwiping movement. If the machine is provided with the stop device shown in Figs. 13 and 14, this device may be so adjusted that downward movement of the fingers 53 and the member 56 is arrested before they meet the upper on the wipers, thus delaying the clamping of the upper and reducing the amount of pull applied to the upper in the upwiping operation. In any case, the pressure of the fingers 53 on the upper is determined by the setting of the adjusting device associated with the spring 317. As the fingers 53 engage the upper, they may rock slightly about their pivotal connections with their supporting arms 225, and the plate-like member 201 also may rock relatively to the carrier 181 about the axis extending lengthwise of the shoe. At this stage of the cycle the fingers 55 are inclined forwardly and upwardly (see Fig. 12), since the tips of these fingers would be unable to descend to the level of the fingers 53 because of the fact that the marginal portion of the upper not far from the front ends of these fingers is secured to the insole by the side pulling-over tacks.

As the wipers rise, the fingers 53 and the member 56 clamp the upper materials on their top faces yieldingly with a slipping grip and cause the upper to be tensioned heightwise of the last, the fingers and the member 56 being moved upwardly by the wipers against the resistance of the spring 317. To permit this, the cam track associated with the cam roll 309 is widened along a portion of its length so that the cam roll may move away from the cam surface, the widened portion terminating at a point corresponding to about 140° of revolution of the cam shaft 315. Thus, while the full line B on the chart, representing the contour of this cam surface, rises from a low point at about 83° to a horizontal portion beginning at about 140°, along this rise the cam roll will be separated from the cam surface by the lifting action of the wipers on the fingers 53 and the member 56. The horizontal dot-and-dash line associated with the line B indicates the limit of movement of the cam roll under the influence of the spring 317 when the stop device shown in Figs. 13 and 14 is in its lowest position and the downward movement of the carrier 181 is arrested with the lower faces of the fingers 53 and the member 56 only about one eighth of an inch lower than the edge of the insole. Similarly, the dot-and-dash line associated with the full line C indicates the limit of movement of the cam roll 361 under the influence of the spring 331 under the same conditions. When the wipers, after their upwiping action, are ready to wipe the marginal portion of the upper inwardly over the insole, the lower faces of the fingers 53 and 55 are substantially in a common horizontal plane, the fingers 55 having been swung about the pivot studs 249 into that relation to the fingers 53 in the upwiping operation.

At about the time when the wipers begin their upwiping movement the auxiliary wipers 51 are moved inwardly by their operating mechanism, as indicated by the line F on the chart, so that they will yieldingly engage the upper in the vicinity of the tip line and assist the wipers 43 in their upwiping action in those locations. When the wipers 43 arrive in positions to begin to wipe the upper inwardly over the insole, the auxiliary wipers lie beneath upper material immediately below the auxiliary fingers 55 and are, in fact, pressing the upper against these fingers, the pressure being mainly determined by the spring 331.

As the wipers 43 wipe the upper inwardly, they are closed somewhat and moved bodily forward as described in Letters Patent No. 2,160,846. During this operation it is desirable to relieve somewhat the pressure of the member 56 and the fingers 53 on the upper, since otherwise, because of the gathering or pleating action taking place in the margin of the upper, especially around the end of the toe, the tension developed may be excessive. On the other hand, it is desirable to hold the marginal portion of the upper in the vicinity of the ends of the tip line firmly clamped, in order to prevent heelward flow or deflection of the upper in those locations. To this end, while the fingers 55 are held pressed downwardly by the links 259 under the action of the spring 331 on the arm 355 (the cam roll 361 being out of engagement with its cam surface) to clamp the upper firmly on the auxiliary wipers 51, the lever 283 is swung somewhat clockwise with reference to Fig. 2 to raise the carrier 181 with the fingers 53 and the member 56 supported thereby. This raising of the carrier is effected by re-engagement of the cam roll 309 by its cam surface after about 135° of rotation of the cam shaft 315. As the fingers 53 are thus raised, the blocks 229 (Fig. 5) are moved rectilinearly upward relatively to the plungers 239 and the heads 241 of which have therein the pivot studs 249 for the fingers 55. The fingers 55, therefore, remain substantially horizontal. In order further to minimize any tendency for heelward flow of the upper in the vicinity of the tip line, the auxiliary wipers 51 against which the upper is clamped by the fingers 55 do not partake of the bodily heelward movements of the main wipers 43.

During the closing movements of the wipers 43 the cam track acting on the roll 405 (Fig. 2) causes the bell-crank lever 391 to swing a short distance in a counterclockwise direction and thereby to impart rearward movement to the slide 205 (Fig. 4). In this manner the retarder fingers 53 and 55 are swung short distances in inward directions, thus causing them to move inwardly with the wipers 43, together with the auxiliary wipers 51 controlled by the springs 139, and thereby to control the upper as long as possible in the overwiping operation. These movements of the fingers are represented by the downward inclination of the line D (Fig. 17) between 135° and 165° of the cycle. It will be appreciated that if the fingers were to remain stationary during the overwiping movements of the wipers, the upper would slip between them and the wipers at a rate equal to twice that of the movements of the wipers, whereas if the fingers move with the wipers this rate is only that of the movements of the wipers. The machine comes automatically to a stop at 175° of the cycle, and immediately prior to the end of this first stage of the cycle the downward pressure of the wipers on the shoe is somewhat relieved as described in Letters Patent No. 2,160,846.

During the pause in the cycle after the machine thus comes to a stop the operator fastens an end of toe binder wire to a tack at the left-hand side of the shoe bottom and applies the wire preliminarily around the toe under the wipers, as described in the last-mentioned Letters Patent, after which he initiates a second stage of the cycle. Early in this second stage of the cycle the carrier 181 is raised to its initial level, as indidated by the line B on the chart, and through the links 259 the fingers 55 are swung upwardly about their pivot studs 249, as indicated by the line C on the chart, until the faces 255 (Fig. 5) on the lugs 251 abut against the faces 257 on the ears 235 of the blocks 229. Further upward movement of the links 259 then causes the plungers 239 to move rectilinearly upward relatively to the blocks 229, thereby restoring the pivot studs 249 to their initial positions relatively to the blocks 229. Early, moreover, in the second stage of the cycle the wipers are slightly raised, backed off and opened to enable the operator to pull the binder wire in tightly against the margin of the upper lying against the lip of the insole, after which the wipers are again advanced, closed and lowered to force the wire firmly against the upstanding margin of the upper and to press the upper down on the insole, as described in Letters Patent No. 2,160,846.

As hereinbefore explained, the machine herein shown may be provided with a cam like that shown at 509 in Fig. 15, rather than the cam 167 shown in Fig. 1, for operating the auxiliary wipers 51. The highest portion of this cam is extended a substantial distance farther about its axis than the corresponding portion of the cam 167, and accordingly the auxiliary wipers, which are moved inwardly over the insole with the main wipers, are not retracted until after the main wipers have been raised, backed off and opened and thereafter advanced, closed and lowered again in the manner above described. Accordingly, the auxiliary wipers, which are pressed inwardly against the upper at this time through the springs 139, help to hold the upper at the sides of the toe against movement when the main wipers are backed off and opened as above described by pressing upstanding marginal portions of the upper against the lip of the insole or against the plate 5. The auxiliary wipers are first partially retracted immediately after 250° of the cycle, as indicated by the line F on the chart, since it is impracticable to retract them fully at this time because of limited space between them and the wiper carriers 45 for the main wipers. Substantially at this time the toe rest is forced more firmly upward and the wipers more firmly downward on the upper, after which the machine again comes to a stop at 270° of the cycle as described in Letters Patent No. 2,160,846. During the ensuing pause in the cycle the operator secures the binder wire to a tack at the right-hand side of the shoe bottom and severs the portion thus secured to the shoe from the remainder of the wire. He then initiates the third and final stage of the cycle, during which the links 259 are moved downward to cause the fingers 55 to swing downward to their initial inclined positions (Fig. 2) and the carrier 181 is moved forward through the links 193 to restore the fingers 53 and 55 and the member 56 otherwise to their initial positions. During this third stage of the cycle the wipers 43 and the auxiliary wipers 51 also are returned to their initial positions, as are likewise the toe rest 11 and the heel rest 41. Immediately before the completion of the third stage of the cycle the high part of the cam acting on the roll 433 (Fig. 2) engages the roll and causes the locking lever 413 to release the slide 397 in its guideway in the bracket 409.

Having described the invention, what I claim as new and desire to secure by Letters Patent of the United States is:

1. In a lasting machine, a shoe-positioning device constructed and arranged to engage the inner face of a lip on a welt shoe insole on a last around the toe-end portion of the insole to position the shoe, wipers for wiping the upper around the toe end of the last into lasted position, a pair of retarder fingers arranged to extend lengthwise of the shoe along the sides of the toe and to clamp the marginal portion of the upper on said wipers to control it in the lasting operation, and means for positioning said fingers with the ends thereof which are farthest from the end of the toe initially in engagement with the opposite sides of said shoe-positioning device.

2. In a lasting machine, a shoe-positioning device constructed and arranged to engage the inner face of a lip on a welt shoe insole on a last around the toe-end portion of the insole to position the shoe bottom upward, said device being formed to extend farther upward than the lip of the insole, wipers for wiping the upper around the toe end of the last into lasted position, a pair of retarder fingers arranged to extend lengthwise of the shoe along the sides of the toe and to clamp the marginal portion of the upper on said wipers to control it in the lasting operation, and means for yieldingly holding the ends of said fingers which are farthest from the end of the toe initially in engagement with the opposite sides of said shoe-positioning device above the lip of the insole.

3. In a lasting machine, a shoe-positioning device constructed and arranged to engage the inner face of a lip on a welt shoe insole on a last around the toe-end portion of the insole to position the shoe, wipers for wiping the upper around the toe end of the last into lasted position, a pair of retarder fingers arranged to extend lengthwise of the shoe along the sides of the toe and to clamp the marginal portion of the upper on said wipers to control it in the lasting operation, said fingers being initially positioned with the ends thereof which are farthest from the end of the toe yieldingly in engagement with the opposite sides of said shoe-positioning device, and means for maintaining said fingers initially in inclined positions toward the bottom of the last in the direction of its heel end.

4. In a lasting machine, a shoe-positioning device constructed and arranged to engage the inner face of a lip on a welt shoe insole on a last around the toe-end portion of the insole to position the shoe, wipers for wiping the upper around the toe end of the last into lasted position, a pair of retarder fingers arranged to extend lengthwise of the shoe along the sides of the toe and to clamp the marginal portion of the upper on said wipers to control it in the lasting operation, mechanism for moving said fingers outwardly widthwise of the last in the operation of the machine, a spring arranged to act through a portion only of said mechanism to hold the ends of said fingers which are farthest from the end of the toe initially in engagement with the opposite sides of said shoe-positioning device, and means for preventing said spring from influencing said mechanism when the mechanism is operated thus to move the fingers.

5. In a lasting machine, a shoe-positioning device constructed and arranged to engage the inner face of a lip on a welt shoe insole on a last around the toe-end portion of the insole to position the shoe, wipers for wiping the upper around the toe end of the last into lasted position, a pair of retarder fingers arranged to clamp the marginal portion of the upper on said wipers near the end of the toe, another pair of retarder fingers arranged to extend along the sides of the toe in locations beyond said first-named fingers, and means for positioning said other fingers with the ends thereof which are farthest from the end of the toe initially in engagement with the opposite sides of said shoe-positioning device.

6. In a lasting machine, a shoe-positioning device constructed and arranged to engage the inner face of a lip on a welt shoe insole on a last around the toe-end portion of the insole to position the shoe, said device being removable to permit a device of different size or shape to be substituted, wipers for wiping the upper around the toe end of the last into lasted position, a pair of retarder fingers arranged to clamp the marginal portion of the upper on said wipers near the end of the toe, another pair of retarder fingers arranged to extend along the sides of the toe in locations beyond said first-named fingers, and spring means for initially holding the ends of said other fingers which are farthest from the end of the toe yieldingly against the opposite sides of said shoe-positioning device regardless of the size or shape of said device.

7. In a lasting machine, a shoe-positioning device constructed and arranged to engage the inner face of a lip on a welt shoe insole on a last around the toe-end portion of the insole to position the shoe, wipers for wiping the upper around the toe end of the last into lasted position, a pair of retarder fingers arranged to clamp the marginal portion of the upper on said wipers near the end of the toe, another pair of retarder fingers arranged to extend along the sides of the toe in locations beyond said first-named fingers, mechanism for moving all said fingers outwardly widthwise of the last in the operation of the machine, a spring arranged to act through a portion only of said mechanism to hold the ends of said other fingers which are farthest from the end of the toe initially in engagement with the opposite sides of said shoe-positioning device, and means for preventing said spring from influencing said mechanism when the mechanism is operated thus to move the fingers.

8. In a lasting machine, a shoe-positioning device constructed and arranged to engage the inner face of a lip on a welt shoe insole on a last around the toe-end portion of the insole to position the shoe, wipers for wiping the upper around the toe end of the last into lasted position, a pair of retarder fingers arranged to clamp the marginal portion of the upper on said wipers near the end of the toe, another pair of retarder fingers arranged to extend along the sides of the toe in locations beyond said first-named fingers, a lever for swinging all said fingers outwardly widthwise of the last in the operation of the machine, means for operating said lever thus to swing the fingers, a movable support on which the lever is pivotally mounted, a spring arranged to act on said lever through said movable support to hold the ends of said other fingers which are farthest from the end of the toe initially in engagement with the opposite sides of said shoe-positioning device, and means for locking said support to prevent any influence of the spring on said lever when the lever is operated to swing the fingers.

9. In a lasting machine, a shoe-positioning device constructed and arranged to engage the inner face of a lip on a welt shoe insole on a last around the toe-end portion of the insole to position the shoe, wipers for wiping the upper around the toe end of the last into lasted position, a pair of retarder fingers arranged to clamp the marginal portion of the upper on said wipers near the end of the toe, another pair of retarder fingers arranged to extend along the sides of the toe in locations beyond said first-named fingers, a cam-operated lever connected to all said fingers for swinging them outwardly widthwise of the last in the operation of the machine, a slide on which said lever is pivotally mounted, a spring tending to move said slide in one direction for thereby holding the ends of said other fingers which are farthest from the end of the toe initially in engagement with the opposite sides of said shoe-positioning device, and cam-operated means for locking said slide to prevent any influence of the spring on said lever when the lever is operated to swing the fingers.

10. In a lasting machine, wipers for wiping an upper about the toe end of a last heightwise of the last and thereafter inwardly over an insole on the last, a pair of retarder fingers arranged to clamp the marginal portion of the upper on said wipers near the end of the toe, another pair of retarder fingers arranged to extend along the sides of the toe in locations beyond said first-named fingers, said other fingers being mounted to swing heightwise of the last about axes substantially at the ends thereof which are nearest to the end of the toe, means for positioning the first-named fingers initially in generally parallel relation to the toe end of the insole, and means for positioning said other fingers initially in a relation to the first-named fingers inclined toward the bottom of the last in the direction of its heel end.

11. In a lasting machine, means for positioning a shoe on a last bottom upward, wipers for wiping the upper about the toe end of the last upwardly and thereafter inwardly over an insole on the last, a pair of retarder fingers arranged to clamp the marginal portion of the upper on said wipers near the end of the toe, another pair of retarder fingers arranged to extend along the sides of the toe in locations beyond said first-named fingers, said other fingers being mounted to swing upwardly or downwardly about axes located substantially at the ends thereof which are nearest to the end of the toe, means for positioning the first-named fingers initially in generally parallel relation to the toe end of the insole at a higher elevation than that end of the insole, and means for positioning said other fingers initially in a relation to the first-named fingers downwardly inclined toward the heel end of the shoe.

12. In a lasting machine, a shoe-positioning device constructed and arranged to engage the inner face of a lip on a welt shoe insole on a last around the toe-end portion of the insole to position the shoe bottom upward, wipers for wiping the upper about the toe end of the last upwardly and thereafter inwardly over the insole, a pair of retarder fingers arranged to clamp the marginal portion of the upper on said wipers near the end of the toe, another pair of retarder fingers arranged to extend along the sides of the toe in locations beyond said first-named fingers, said other fingers being mounted to swing upwardly or downwardly about axes located substantially at the ends thereof which are nearest to the end of the toe, means for positioning the first-named fingers initially in generally parallel relation to the toe end of the insole at a higher elevation than that end of the insole, and means for positioning said other fingers initially in a relation to the first-named fingers downwardly inclined toward the heel end of the shoe with the ends thereof which are farthest from the end of the toe in yielding engagement with the opposite sides of said shoe-positioning device above the lip of the insole.

13. In a lasting machine, wipers for wiping an upper about the toe end of a last heightwise of the last and thereafter inwardly over an insole on the last, a pair of retarder fingers arranged to clamp the marginal portion of the upper on said wipers near the end of the toe, another pair of retarder fingers arranged to extend along the sides of the toe in locations beyond said first-named fingers, said other fingers being mounted to swing heightwise of the last about axes located substantially at the ends thereof which are nearest to the end of the toe, means for positioning the first-named fingers initially in generally parallel relation to the toe end of the insole and for moving them heightwise of the last toward the wipers preparatory to the clamping of the upper on the wipers, and means for positioning said other fingers initially in a relation to the first-named fingers inclined toward the bottom of the last in the direction of its heel end and for swinging them about their axes to opposite inclinations as the first-named fingers are moved toward the wipers.

14. In a lasting machine, means for positioning a shoe on a last bottom upward, wipers for wiping the upper about the toe end of the last upwardly and thereafter inwardly over an insole on the last, a pair of retarder fingers arranged to clamp the marginal portion of the upper on said wipers near the end of the toe, another pair of retarder fingers arranged to extend along the sides of the toe in locations beyond said first-named fingers, said other fingers being mounted to swing upwardly or downwardly about axes located substantially at the ends thereof which are nearest to the end of the toe, means for positioning the first-named fingers initially at a higher elevation than the toe end of the insole and for moving them downwardly toward the wipers preparatory to the clamping of the upper on the wipers, and means for positioning said other fingers initially in a relation to the first-named fingers downwardly inclined toward the heel end of the shoe and for swinging them about their axes to opposite inclinations as the first-named fingers are moved downwardly toward the wipers.

15. In a lasting machine, wipers for wiping an upper about the toe end of a last heightwise of the last and thereafter inwardly over an insole on the last, a pair of retarder fingers arranged to clamp the marginal portion of the upper on said wipers near the end of the toe, another pair of retarder fingers arranged to extend along the sides of the toe in locations beyond said first-named fingers, said other fingers being mounted to swing heightwise of the last about axes located substantially at the ends thereof which are nearest to the end of the toe, means for moving the first-named fingers heightwise of the last toward the wipers preparatory to the clamping of the upper on the wipers, and means connected to said other fingers for positioning them initially in a relation to the first-named fingers inclined toward the bottom of the last in the direction of its heel end and for swinging them about their axes to opposite inclinations in response to the movement of the first-named fingers toward the wipers.

16. In a lasting machine, wipers for wiping an upper about the toe end of a last heightwise of the last and thereafter inwardly over an insole on the last, a pair of retarder fingers arranged to clamp the marginal portion of the upper on said wipers near the end of the toe, another pair of retarder fingers arranged to extend along the sides of the toe in locations beyond said first-named fingers, said other fingers being mounted to swing heightwise of the last about axes located substantially at the ends thereof which are nearest to the end of the toe, means for moving the first-named fingers heightwise of the last toward the wipers preparatory to the clamping of the upper on the wipers, and means for swinging said other fingers about their axes into positions inclined heightwise of the last away from the wipers in heelward directions as the first-named fingers are thus moved toward the wipers.

17. In a lasting machine, wipers for wiping an upper about the toe end of a last heightwise of the last and thereafter inwardly over an insole on the last, a pair of retarder fingers arranged to clamp the marginal portion of the upper on said wipers near the end of the toe, another pair of retarder fingers arranged to extend along the sides of the toe in locations beyond said first-named fingers, said other fingers being mounted to swing heightwise of the last about axes located substantially at the ends thereof which are nearest to the end of the toe, a support for the first-named fingers mounted for movement heightwise of the last to carry them toward the wipers preparatory to the clamping of the upper on the wipers, and members connected to said other fingers for swinging them about their axes to positions in which they are inclined heightwise of the last away from the wipers in heelward directions in response to the movement of said support.

18. In a lasting machine, wipers for wiping an upper about the toe end of a last heightwise of the last and thereafter inwardly over an insole on the last, a pair of retarder fingers arranged to clamp the marginal portion of the upper on said wipers near the end of the toe as the upper is wiped heightwise of the last, another pair of retarder fingers arranged to extend along the sides of the toe in locations beyond said first-named fingers, said other fingers being mounted to swing heightwise of the last about axes located substantially at the ends thereof which are nearest to the end of the toe, and means for positioning said other fingers in a relation to the first-named fingers inclined heightwise of the last away from the wipers in heelward directions when the first-named fingers first clamp the upper on the wipers and for swinging them about their axes into substantially parallel relation to the wipers as the upper is thereafter wiped heightwise of the last.

19. In a lasting machine, means for positioning a shoe on a last bottom upward, wipers for wiping the upper about the toe end of the last upwardly and thereafter inwardly over an insole on the last, a pair of retarder fingers arranged to clamp the marginal portion of the upper on said wipers near the end of the toe as the upper is wiped upwardly, another pair of retarder fingers arranged to extend along the sides of the toe in locations beyond said first-named fingers, said other fingers being mounted to swing upwardly or downwardly about axes located substantially at the ends thereof which are nearest to the end of the toe, and means for positioning said other fingers in upwardly inclined relation to the first-named fingers in heelward directions when the first-named fingers first clamp the upper on the wipers and for swinging them about their axes into substantially parallel relation to the wipers in response to upward movement of the wipers.

20. In a lasting machine, wipers for wiping an upper about the toe end of a last into lasted position, a pair of retarder fingers arranged to clamp the marginal portion of the upper on said wipers near the end of the toe, and another pair of retarder fingers arranged to extend along the sides of the toe in locations beyond said first-named fingers, all said fingers being mounted to swing widthwise of the last in the course of the lasting operation and said other fingers being further mounted to swing heightwise of the last about axes located substantially at the ends thereof which are nearest to the end of the toe.

21. In a lasting machine, wipers for wiping an upper about the toe end of a last into lasted position, a pair of retarder fingers arranged to clamp the marginal portion of the upper on said wipers near the end of the toe, another pair of retarder fingers arranged to extend along the sides of the toe in locations beyond said first-named fingers, all said fingers being mounted to swing widthwise of the last in the course of the lasting operation, and supports for said other fingers mounted for rectilinear movements heightwise of the last relatively to the first-named fingers and on which said other fingers are mounted to swing heightwise of the last.

22. In a lasting machine, wipers for wiping an upper about the toe end of a last heightwise of the last and thereafter inwardly over an insole on the last, a pair of retarder fingers arranged to clamp the marginal portion of the upper on said wipers near the end of the toe, another pair of retarder fingers arranged to extend along the sides of the toe in locations beyond said first-named fingers, said other fingers being mounted to swing heightwise of the last about axes located substantially at the ends thereof which are nearest to the end of the toe, and means for thus swinging said other fingers in the course of the lasting operation.

23. In a lasting machine, wipers for wiping an upper about the toe end of a last heightwise of the last and thereafter inwardly over an insole on the last, a pair of retarder fingers arranged to clamp the marginal portion of the upper on said wipers near the end of the toe, another pair of retarder fingers arranged to extend along the sides of the toe in locations beyond said first-named fingers, said other fingers being mounted to swing heightwise of the last about axes located substantially at the ends thereof which are nearest to the end of the toe, means for moving said first-named fingers heightwise of the last in the lasting operation, and means connected to said other fingers for controlling movements thereof about said axes during the movements of said first-named fingers.

24. In a lasting machine, main wipers for wiping an upper about the toe end of a last heightwise of the last and for thereafter wiping its marginal portion inwardly over a welt shoe insole on the last and into upstanding position against a lip on the insole, a device arranged to support said lip against the inward pressure of the wipers, auxiliary wipers adjacent to said main wipers for wiping heightwise of the last portions of the upper also acted upon by said main wipers at the sides only of the toe, and means constructed to move said auxiliary wipers inwardly over the insole with the main wipers into pressure-applying relation to the upstanding marginal portions of the upper adjacent to the lip of the insole and to maintain them in that relation to the upper during partial retractive movements and subsequent repeated inward movements of the main wipers.

25. In a lasting machine, main wipers for wiping an upper about the toe end of a last heightwise of the last and for thereafter wiping its marginal portion inwardly over a welt shoe insole on the last and into upstanding position against a lip on the insole, a device arranged to support said lip against the inward pressure of the wipers, auxiliary wipers adjacent to said main wipers for wiping heightwise of the last portions of the upper also acted upon by said main wipers at the sides only of the toe, said auxiliary wipers being movable inwardly over the insole with the main wipers, springs associated with said auxiliary wipers for pressing them inwardly against the upstanding marginal portions of the upper adjacent to the lip of the insole, and mechanism arranged to act throught said springs to maintain the auxiliary wipers in that relation to the upper during partial retractive movements and subsequent repeated inward movements of the main wipers.

26. In a lasting machine, main wipers for wiping an upper about the toe end of a last heightwise of the last, said main wipers being mounted to move bodily lengthwise of the last and to close inwardly widthwise of the last to wipe the marginal portion of the upper inwardly over an insole on the last, auxiliary wipers adjacent to said main wipers for wiping heightwise of the last portions of the upper also acted upon by said main wipers at the sides only of the toe, retarder members arranged to clamp the marginal portion of the upper outspread on said auxiliary wipers, and mechanisms constructed and arranged to impart to said retarder members and auxiliary wipers inward movements widthwise only of the last over the insole while clamping the marginal portion of the upper between them in the course of inward movements of the main wipers both widthwise and lengthwise of the last.

27. In a lasting machine, main wipers for wiping an upper about the toe end of a last heightwise of the last and for thereafter wiping its marginal portion inwardly over an insole on the last, a wiper carrier supporting said wipers and mounted for movement heightwise of the last to cause the wipers to wipe the upper in that direction, auxiliary wipers movable heightwise of the last with the main wipers in wiping engagement with portions of the upper also acted upon by the main wipers at the sides only of the toe, levers supported by said movable wiper carrier for moving the auxiliary wipers inwardly toward the sides of the last, other levers supported independently of the wiper carrier, and link connections for operating the first-named levers by said other levers while permitting the movement of the wiper carrier heightwise of the last.

28. In a lasting machine, main wipers for wiping an upper about the toe end of a last heightwise of the last and for thereafter wiping its marginal portion inwardly over an insole on the last, a wiper carrier supporting said wipers and mounted for movement heightwise of the last to cause the wipers to wipe the upper in that direction, auxiliary wipers movable heightwise of the last with the main wipers in wiping engagement with portions of the upper also acted upon by the main wipers at the sides only of the toe, levers supported by said movable wiper carrier and mounted for movements about axes extending heightwise of the last to move the auxiliary wipers inwardly toward the sides of the last, other levers supported independently of the wiper carrier for movements about an axis extending widthwise of the last, and links having universal joint connections with said first-named levers and the other levers for operating the first-named levers while permitting the movements of the wiper carrier heightwise of the last.

29. In a lasting machine, main wipers for wiping an upper about the toe end of a last heightwise of the last and for thereafter wiping its marginal portion inwardly over an insole on the last, auxiliary wipers positioned adjacent to said main wipers and arranged to act at the sides only of the toe on portions of the upper also acted upon by said main wipers, levers mounted for swinging movements about axes extending heightwise of a last for moving the auxiliary wipers inwardly toward the sides of the last, and supporting means on which said levers are thus mounted, said supporting means being mounted for movement to adjust the auxiliary wipers lengthwise of the last relatively to the main wipers.

30. In a lasting machine, main wipers for wiping an upper about the toe end of a last heightwise of the last and for thereafter wiping its marginal portion inwardly over an insole on the last, auxiliary wipers positioned adjacent to said main wipers and arranged to act at the sides only of the toe on portions of the upper also acted upon by said main wipers, levers mounted for swinging movements about axes extending heightwise of the last to move said auxiliary wipers inwardly toward the sides of the last, supporting members on which said levers are thus mounted, and an adjusting member connected to said supporting members for adjusting them and the auxiliary wipers lengthwise of the last relatively to the main wipers.

31. In a lasting machine, main wipers for wiping an upper about the toe end of a last into lasted position, auxiliary wipers positioned adjacent to said main wipers and arranged to act at the sides only of the toe on portions of the upper also acted upon by said main wipers, operating mechanism for moving said auxiliary wipers inwardly widthwise of the last, and means dependent upon the absence of a shoe from the machine for causing said operating mechanism to move the auxiliary wipers less far inwardly if the machine is operated in the absence of a shoe than when there is a shoe in position to be operated upon.

32. In a lasting machine, main wipers for wiping an upper about the toe end of a last into lasted position, auxiliary wipers positioned adjacent to said main wipers and arranged to act at the sides only of the toe on portions of the upper also acted upon by said main wipers, operating mechanism for moving said auxiliary wipers inwardly widthwise of the last, said operating mechanism including members arranged to be operated one by the other thus to move said auxiliary wipers, and means dependent upon the absence of a shoe from the machine for causing lost motion between said members and for thereby preventing them from moving the auxiliary wipers so far inwardly under those conditions as when there is a shoe in position to be operated upon.

33. In a lasting machine, main wipers for wiping an upper about the toe end of a last into lasted position, auxiliary wipers positioned adjacent to said main wipers and arranged to act at the sides only of the toe on portions of the upper also acted upon by said main wipers, operating mechanism for moving said auxiliary wipers inwardly widthwise of the last, said operating mechanism including members arranged to be operated one by the other thus to move said auxiliary wipers, a device for transmitting movement from one of said members to the other, said device being displaceable to provide for lost motion between the members, and means dependent upon the absence of a shoe from the machine for thus displacing said device and for thereby preventing said members from moving the auxiliary wipers so far inwardly in the absence of a shoe as when there is a shoe in position to be operated upon.

34. In a lasting machine, main wipers for wiping an upper about the toe end of a last into lasted position, auxiliary wipers positioned adjacent to said main wipers and arranged to act at the sides only of the toe on portions of the upper also acted upon by said main wipers, operating mechanism for moving said auxiliary wipers inwardly widthwise of the last, said operating mechanism including a pair of levers arranged to be operated one by the other thus to move said auxiliary wipers, a device for transmitting movement from one of said levers to the other, said device being pivotally mounted on one of said levers to permit it to be displaced and thereby to provide for lost motion between the levers, and means dependent upon the absence of a shoe from the machine for thus displacing said device and for thereby preventing said levers from moving the auxiliary wipers so far inwardly in the absence of a shoe as when there is a shoe in position to be operated upon.

35. In a lasting machine, a device for engaging the bottom of the toe end of a shoe to position the shoe, a toe rest for clamping the shoe against said device, a support for said toe rest movable to carry it into operative position and thus movable a greater distance if the machine is operated in the absence of a shoe, main wipers for wiping the upper around the toe end of the shoe into lasted position, auxiliary wipers positioned adjacent to said main wipers and arranged to act at the sides only of the toe on portions of the upper also acted upon by said main wipers, operating mechanism for moving said auxiliary wipers inwardly widthwise of the shoe, and means controlled by said toe rest support for causing said operating mechanism to move the auxiliary wipers less far inwardly if the machine is operated in the absence of a shoe than when there is a shoe in position to be operated upon.

36. In a lasting machine, a device for engaging the bottom of the toe end of a shoe to position the shoe, a toe rest for clamping the shoe against said device, a support for said toe rest movable to carry it into operative position and thus movable a greater distance if the machine is operated in the absence of a shoe, main wipers for wiping the upper around the toe end of the shoe into lasted position, auxiliary wipers positioned adjacent to said main wipers and arranged to act at the sides only of the toe on portions of the upper also acted upon by said main wipers, operating mechanism for moving said auxiliary wipers inwardly widthwise of the shoe, said operating mechanism including members arranged to be operated one by the other thus to move said auxiliary wipers, a device for transmitting movement from one of said members to the other, said device being displaceable to provide for lost motion between said members, and means arranged to be operated by said toe rest support thus to displace said device if the machine is operated in the absence of a shoe and thereby to prevent the auxiliary wipers from being moved so far inwardly as when there is a shoe in position to be operated upon.

FRANK COLEMAN CHOICE.

REFERENCES CITED

The following references are of record in the file of this patent:

UNITED STATES PATENTS

| Number | Name | Date |
|---|---|---|
| 2,234,279 | Ricks et al. | Mar. 11, 1941 |

FOREIGN PATENTS

| Number | Country | Date |
|---|---|---|
| 510,086 | Great Britain | July 26, 1939 |